(12) United States Patent
Faccin et al.

(10) Patent No.: US 9,839,061 B2
(45) Date of Patent: Dec. 5, 2017

(54) ESTABLISHING AND CONFIGURING DYNAMIC SUBSCRIPTIONS

(71) Applicant: QUALCOMM Incorporated, San Diego, CA (US)

(72) Inventors: Stefano Faccin, Hayward, CA (US); Gavin Horn, La Jolla, CA (US); John Nasielski, San Diego, CA (US)

( * ) Notice: Subject to any disclaimer, the term of this patent is extended or adjusted under 35 U.S.C. 154(b) by 224 days.

(21) Appl. No.: 14/627,503

(22) Filed: Feb. 20, 2015

(65) Prior Publication Data
US 2016/0073441 A1    Mar. 10, 2016

Related U.S. Application Data

(60) Provisional application No. 62/046,755, filed on Sep. 5, 2014.

(51) Int. Cl.
*H04W 76/02* (2009.01)
*H04L 12/46* (2006.01)
(Continued)

(52) U.S. Cl.
CPC ....... *H04W 76/025* (2013.01); *H04L 12/4641* (2013.01); *H04W 4/021* (2013.01);
(Continued)

(58) Field of Classification Search
CPC .. H04L 12/4641; H04W 12/06; H04W 12/08; H04W 48/00; H04W 4/021; H04W 76/025; H04W 84/12
(Continued)

(56) References Cited

U.S. PATENT DOCUMENTS

2002/0097709 A1*   7/2002  Haumont ............ H04W 76/02
                                                        370/352
2003/0166397 A1*   9/2003  Aura .................. H04L 63/0823
                                                        455/410
(Continued)

FOREIGN PATENT DOCUMENTS

| FR | 3003115 A1 | 9/2014 |
| WO | WO-2007037867 A2 | 4/2007 |
| WO | WO-2014067251 A1 | 5/2014 |

OTHER PUBLICATIONS

"Framework of Network Virtualization for Future Networks, Y.3011 (Jan. 2012)," ITU -T Standard, International Telecommunication Union, Geneva, Ch, No . Y.3011 (Jan. 2012), Jan. 13, 2012 (Jan. 13, 2012), pp. 1-28, XP017575387, [retrieved on Jun. 18, 2012] the whole document.
International Search Report and Written Opinion—PCT/US2015/048158—ISA/EPO—dated Dec. 9, 2015.

*Primary Examiner* — Stephen J Clawson
(74) *Attorney, Agent, or Firm* — Qualcomm IP Dept.; James Hunt Yancey, Jr.

(57) ABSTRACT

The disclosure relates in some aspects to the establishment, discovery, and creation of virtual wireless communication networks. A device can create a virtual wireless communication network with a serving mobile network operator (MNO), e.g., via a service provider, and provide information regarding connectivity to the virtual wireless communication network. Provided information can include, without limitation, restricted access to content and uploaded specific content. The disclosure also relates in some aspects to enabling a network to configure access and policing entities to support a virtual wireless communication network.

29 Claims, 21 Drawing Sheets

(51) Int. Cl.
    *H04W 4/02*     (2009.01)
    *H04W 12/08*     (2009.01)
    *H04W 12/06*     (2009.01)
    *H04W 84/12*     (2009.01)
    *H04W 48/00*     (2009.01)

(52) U.S. Cl.
    CPC ........... *H04W 12/06* (2013.01); *H04W 12/08* (2013.01); *H04W 48/00* (2013.01); *H04W 84/12* (2013.01)

(58) Field of Classification Search
    USPC .......................................................... 370/329
    See application file for complete search history.

(56) References Cited

U.S. PATENT DOCUMENTS

| | | | |
|---|---|---|---|
| 2006/0025151 A1* | 2/2006 | Karaoguz | H04L 29/06027 455/455 |
| 2009/0149220 A1* | 6/2009 | Camilleri | H04W 8/183 455/558 |
| 2010/0017861 A1 | 1/2010 | Krishnaswamy et al. | |
| 2012/0317261 A1 | 12/2012 | Ahmavaara | |
| 2013/0262686 A1 | 10/2013 | Hill et al. | |
| 2014/0129691 A1 | 5/2014 | Samovskiy et al. | |
| 2014/0237530 A1 | 8/2014 | Delorme | |
| 2014/0321459 A1 | 10/2014 | Kumar et al. | |
| 2015/0237508 A1* | 8/2015 | Wang | H04W 16/18 370/254 |

\* cited by examiner

ESTABLISHING AND CONFIGURING DYNAMIC SUBSCRIPTIONS

CROSS-REFERENCE TO RELATED APPLICATION(S)

This application claims priority to and the benefit of provisional patent application No. 62/046,755 filed in the U.S. patent office on Sep. 5, 2014, the entire content of which is incorporated herein by reference.

BACKGROUND

Field of the Disclosure

Aspects of the disclosure relate generally to communication, and more specifically, but not exclusively, to dynamic subscriptions.

Description of Related Art

Different wireless communication networks can employ different forms of connection and subscription management. For example, Third Generation Partnership Project (3GPP) deployments and wireless local area network (WLAN) deployments are based on a single subscription model.

In a 3GPP network, a user uses one subscription at a time. Moreover, 3GPP does not support dynamic subscriptions or over-the-air (OTA) sign-up by a user equipment (UE). Also, the Wi-Fi Alliance Hotspot 2.0 (HS2.0) OTA sign-up has not been adopted by 3GPP.

The Wi-Fi Alliance specifies, as a starting point, that a WLAN user manually selects the subscription to be used. In some scenarios, this selection could be performed by upper layer solutions. Based on the subscription selected, appropriate policies (e.g., a HS2.0 managed object (HS2.0 MO)) are designated for the user. Thus, in some aspects, Wi-Fi enables dynamic subscriptions, as well as OTA sign-up for provisioning.

Some wireless communication networks support scenarios where multiple credentials are in use. For example, when a user is connected to a 3GPP network, the user may manually select a specific WLAN and the credentials for it. This typically leads to non-seamless WLAN offload (NSWO) connectivity. Traffic routing can then be based on an access network discovery and selection function (ANDSF). It is theoretically possible that a UE can select a different subscription and a WLAN that enables evolved packet core (EPC) connectivity, but UE and network behavior for traffic routing is undefined in this case.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides a method of communication for determining whether a first wireless communication network supports establishment of a multiple access virtual wireless communication network; and sending at least one parameter to the first wireless communication network, wherein the at least one parameter is for establishing the multiple access virtual wireless communication network and the at least one parameter is sent as a result of the determination.

Another aspect of the disclosure provides an apparatus configured for communication including a memory circuit and a processing circuit coupled to the memory circuit. The processing circuit is configured to determine whether a first wireless communication network supports establishment of a multiple access virtual wireless communication network; and send at least one parameter to the first wireless communication network, wherein the at least one parameter is for the establishment of the multiple access virtual wireless communication network and the at least one parameter is sent as a result of the determination.

Another aspect of the disclosure provides an apparatus configured for communication. The apparatus including means for determining whether a first wireless communication network supports establishment of a multiple access virtual wireless communication network; and means for sending at least one parameter to the first wireless communication network, wherein the at least one parameter is for establishing the multiple access virtual wireless communication network and the at least one parameter is sent as a result of the determination.

Another aspect of the disclosure provides a non-transitory computer readable medium storing computer executable code, including code to determine whether a first wireless communication network supports establishment of a multiple access virtual wireless communication network; and send at least one parameter to the first wireless communication network, wherein the at least one parameter is for the establishment of the multiple access virtual wireless communication network and the at least one parameter is sent as a result of the determination.

Further to the above, in accordance with additional aspects of the disclosure, the multiple access virtual wireless communication network is a dynamic mobile virtual network operator (DMVNO). In accordance with additional aspects of the disclosure, the at least one parameter includes traffic management information for the multiple access virtual wireless communication network.

In accordance with additional aspects of the disclosure, the at least one parameter includes at least one of: a list of devices authorized to access the multiple access virtual wireless communication network, a location restriction for the multiple access virtual wireless communication network, a geographical coverage area for the multiple access virtual wireless communication network, an access restriction for the multiple access virtual wireless communication network, a subscription type for the multiple access virtual wireless communication network, a name for the multiple access virtual wireless communication network, time of operation for the multiple access virtual wireless communication network, services provided by the multiple access virtual wireless communication network, or a multiple access virtual wireless communication network type.

In accordance with additional aspects of the disclosure, credential information for the establishment of the multiple access virtual wireless communication network is communicated; and the credential information includes at least one of: authentication information that authorizes a device to establish the multiple access virtual wireless communication network, or an identifier of the multiple access virtual wireless communication network.

In accordance with additional aspects of the disclosure, the determination includes receiving information that indicates that the first wireless communication network supports the establishment of the multiple access virtual wireless communication network. In accordance with additional aspects of the disclosure, the information is received via at least one of: a broadcast signal, a layer 2 signal, a connection establishment communication, or a protocol configuration option (PCO) information element (IE).

In accordance with additional aspects of the disclosure, the determination includes: sending a query regarding whether the first wireless communication network supports the establishment of the multiple access virtual wireless communication network; and receiving a response to the query, wherein the response indicates that the first wireless communication network supports the establishment of the multiple access virtual wireless communication network.

In accordance with additional aspects of the disclosure, at least one device allowed to access the multiple access virtual wireless communication network is identified; and a credential associated with the multiple access virtual wireless communication network is communicated to the at least one device.

In one aspect, the disclosure provides a method of communication for receiving at least one parameter for establishing a multiple access virtual wireless communication network, wherein the at least one parameter includes traffic management information for the multiple access virtual wireless communication network; and establishing the multiple access virtual wireless communication network according to the at least one parameter.

Another aspect of the disclosure provides an apparatus configured for communication including a memory circuit and a processing circuit coupled to the memory circuit. The processing circuit is configured to receive at least one parameter for establishment of a multiple access virtual wireless communication network, wherein the at least one parameter includes traffic management information for the multiple access virtual wireless communication network; and establish the multiple access virtual wireless communication network according to the at least one parameter.

Another aspect of the disclosure provides an apparatus configured for communication. The apparatus including means for receiving at least one parameter for establishing a multiple access virtual wireless communication network, wherein the at least one parameter includes traffic management information for the multiple access virtual wireless communication network; and means for establishing the multiple access virtual wireless communication network according to the at least one parameter.

Another aspect of the disclosure provides a non-transitory computer readable medium storing computer executable code, including code to receive at least one parameter for establishment of a multiple access virtual wireless communication network, wherein the at least one parameter includes traffic management information for the multiple access virtual wireless communication network; and establish the multiple access virtual wireless communication network according to the at least one parameter.

Further to the above, in accordance with additional aspects of the disclosure, the multiple access virtual wireless communication network is a dynamic mobile virtual network operator (DMVNO).

In accordance with additional aspects of the disclosure, the at least one parameter includes at least one of: a list of devices authorized to access the multiple access virtual wireless communication network, a location restriction for the multiple access virtual wireless communication network, a geographical coverage area for the multiple access virtual wireless communication network, an access restriction for the multiple access virtual wireless communication network, a subscription type for the multiple access virtual wireless communication network, a name for the multiple access virtual wireless communication network, time of operation for the multiple access virtual wireless communication network, services provided by the multiple access virtual wireless communication network, or a multiple access virtual wireless communication network type.

In accordance with additional aspects of the disclosure, credential information for the establishment of the multiple access virtual wireless communication network is communicated; and the credential information includes at least one of: authentication information that authorizes a device to establish the multiple access virtual wireless communication network, or an identifier of the multiple access virtual wireless communication network.

In accordance with additional aspects of the disclosure, operational information for the multiple access virtual wireless communication network is communicated to at least one of: a radio access network node or a wireless access node. In accordance with additional aspects of the disclosure, the operational information includes at least one of: traffic handling information for the multiple access virtual wireless communication network, multiple access virtual wireless communication network information designated for nodes at a specified location, a policy for managing multiple access virtual wireless communication network traffic according to user configuration, or a charging policy for the multiple access virtual wireless communication network.

In accordance with additional aspects of the disclosure, information that indicates that a first wireless communication network supports the establishment of the multiple access virtual wireless communication network is communicated. In accordance with additional aspects of the disclosure, the information is communicated via at least one of: a broadcast signal, a layer 2 signal, a connection establishment communication, or a protocol configuration option (PCO) information element (IE).

In accordance with additional aspects of the disclosure, a query regarding whether a first wireless communication network supports the establishment of the multiple access virtual wireless communication network is received; and a response to the query is communicated, wherein the response indicates that the first wireless communication network supports the establishment of the multiple access virtual wireless communication network.

In accordance with additional aspects of the disclosure, availability of multiple access virtual wireless communication network connectivity is advertised.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Conventionally, cellular networks do not support dynamic creation of virtual networks. Instead, network and device parameters are fixed or change very slowly. Consequently, cellular networks such as 3GPP networks do not support fast virtual network creation, configuration, or re-configuration.

With the introduction of $5^{th}$ Generation (5G) technologies, there is an opportunity to enable the creation of dynamic subscriptions for flexible and easy establishment of virtual wireless communication networks such as dynamic mobile virtual network operators (DMVNOs). For a virtual wireless communication network (e.g., supported by a specific device), the cost of accessing network resources for a set of devices can be charged to the device creating the virtual wireless communication network, to a service provider (e.g., Facebook establishes a DMVNO for free access for Facebook devices), or some other entity.

The disclosure relates in some aspects to the establishment, discovery, and creation of virtual wireless communication networks. In some aspects, a virtual wireless communication network may be a multiple access network that is a subset of a larger wireless communication network.

For example, a device can create a virtual wireless communication network with a serving mobile network operator (MNO), e.g., via a service provider. The device may then provide connectivity-related information to the virtual wireless communication network. This information can relate to, without limitation, restricted access to content and uploaded specific content.

A network may configure access entities and policing entities to support a virtual wireless communication network. For example, certain network entities can be configured to enable a user to establish and/or access the virtual wireless communication network. In addition, certain network entities can be configured to verify that a user is allowed to establish and/or access the virtual wireless communication network.

Figure 1:
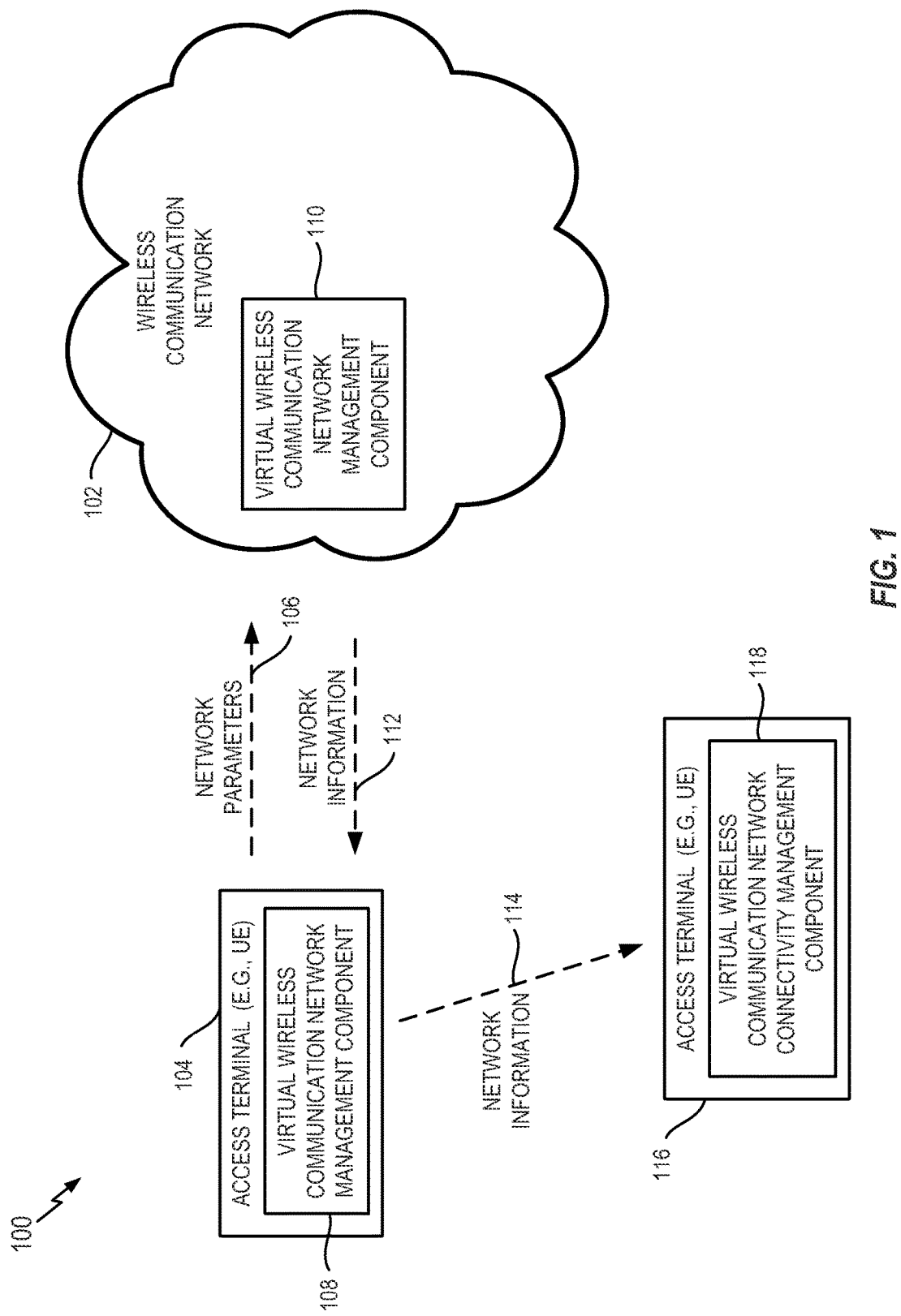
FIG. 1 illustrates an example of establishing a virtual wireless communication network in accordance with some aspects of the disclosure.

FIG. 1 illustrates a simplified example of a communication system 100 where a wireless communication network 102 supports establishment of a virtual wireless communication network. To reduce the complexity of FIG. 1, only a few example components (e.g., access terminals) are shown. However, the teachings herein can be implemented using a different number of components and/or other types of components.

A first access terminal (e.g., a UE) 104 sends network parameters 106 to the network 102 to establish the virtual wireless communication network. As discussed in more detail below, in some aspects, the network parameters 106 can specify attributes of the virtual wireless communication network such as location, geographical coverage area, access restrictions, subscription type, network name, time of operation, packet data network name (e.g., an Access Point Name), list of supported devices, and supported services.

A virtual wireless communication network management (VWCNM) component 108 of the first access terminal 104 determines whether the wireless communication network 102 supports the establishment of a virtual wireless communication network and, if so, cooperates with a virtual wireless communication network management (VWCNM) component 110 of the wireless communication network 102 to establish the virtual wireless communication network (e.g., by sending the network parameters 106). In conjunction with establishing the virtual wireless communication network, the wireless communication network 102 (e.g., the VWCNM component 110) sends network information 112 about the newly established virtual wireless communication network to the first access terminal 104 (e.g., to the VWCNM component 108). As discussed in more detail below, in some aspects, the network information 112 can include credentials to be used to access the established virtual wireless communication network, authentication information to be used to access the established virtual wireless communication network, a network identifier for the established virtual wireless communication network, an Access Point Name to be used to establish connectivity with the established virtual wireless communication network, operational information, and other types of information.

In some aspects, the first access terminal 104 (e.g., the VWCNM component 108) uses the network information 112 to access the newly established virtual wireless communication network. For example, the first access terminal 104 may present credentials to a network entity of the virtual wireless communication network (not shown in FIG. 1) together with the network identifier of the virtual wireless communication network to gain access to the virtual wireless communication network. In addition, the first access terminal 104 can sent network information 114 to a second access terminal 116. For example, the VWCNM component 108 can send a network identifier of the virtual wireless communication network, network credentials to be used to access the established virtual wireless communication network, authentication information to be used to access the established virtual wireless communication network, an Access Point Name to be used to establish connectivity with the established virtual wireless communication network, operational information, and other types of information to a virtual wireless communication network connectivity management (VWCNCM) component 118 of the second access terminal 116. The VWCNCM component 118 can then use this information to gain access to the virtual wireless communication network.

Figure 2:
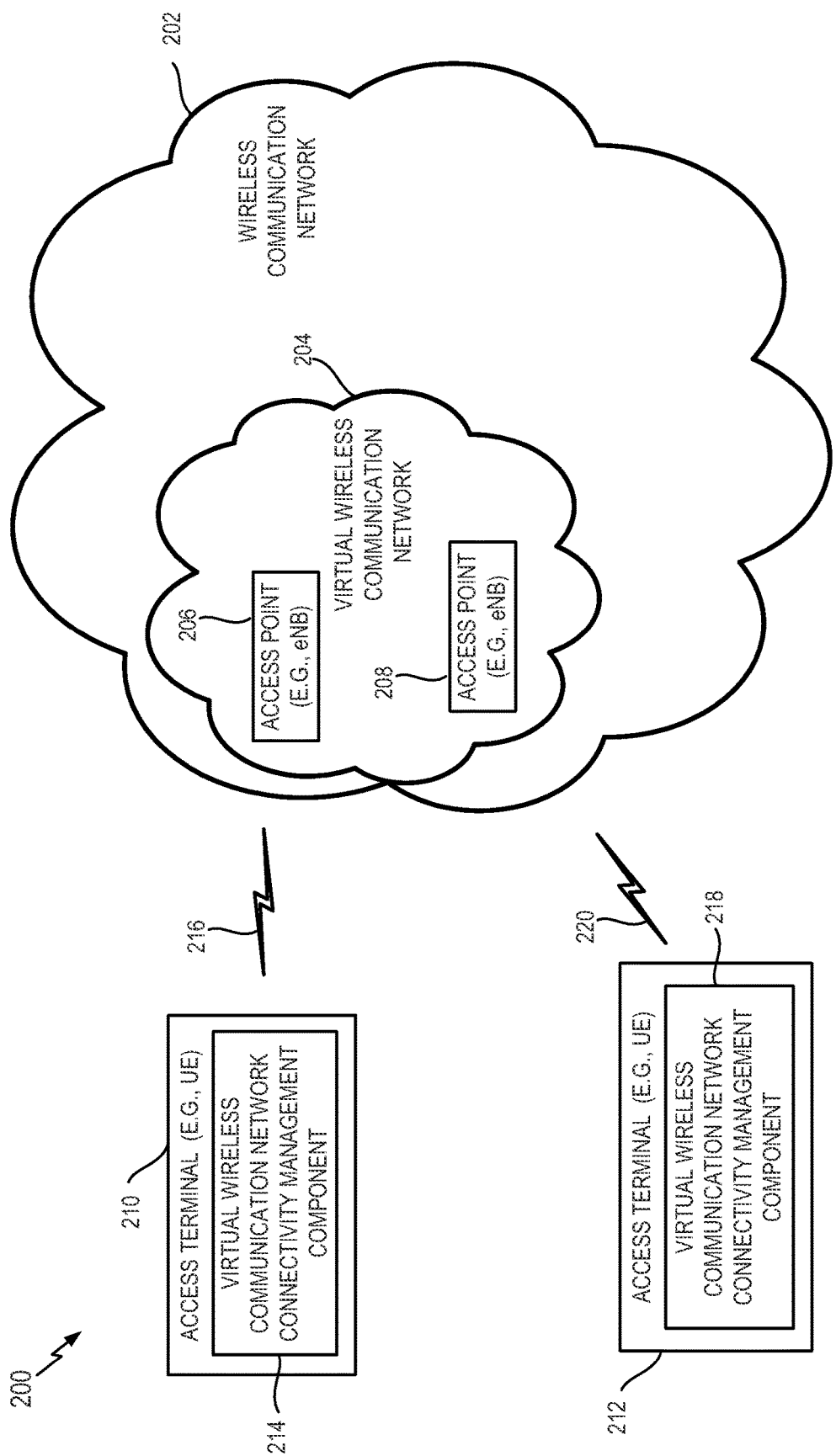
FIG. 2 illustrates an example of accessing a virtual wireless communication network in accordance with some aspects of the disclosure.

FIG. 2 illustrates a simplified example of a communication system 200 where a wireless communication network 202 has established a virtual wireless communication network 204. The wireless communication network 202 may correspond to the wireless communication network 102 of FIG. 1. To reduce the complexity of FIG. 2, only a few example components (e.g., access terminals and access points) are shown. However, the teachings herein can be implemented using a different number of components and/or other types of components.

The virtual wireless communication network 204 includes some of the network entities of the wireless communication network 202 such as a first access point 206 (e.g., an eNode B (eNB)) and a second access point 208. In practice, a virtual wireless communication network may employ a different number of access points depending on, for example, the network requirements, the available resources, etc., for the deployment.

Access terminals that are aware of the virtual wireless communication network 204 and are authorized to access the virtual wireless communication network 204 can thus obtain service via the virtual wireless communication network 204 whenever the access terminals are within the coverage area of the virtual wireless communication network 204. In the simplified example of FIG. 2, a first access terminal 210 and a second access terminal 212 are accessing the virtual wireless communication network 204. In practice, a different number of access terminals may be authorized to access a virtual wireless communication network.

A virtual wireless communication network connectivity management (VWCNCM) component 214 of the first access terminal 210 manages communication (as represented by a wireless signal symbol 216) between the first access terminal 210 and the first access point 206 of the virtual wireless communication network 204. For example, the VWCNCM component 214 may identify the presence of the virtual wireless communication network 204 (e.g., based on pilots, beacons, or other signaling broadcast by the first access point 206). The VWCNCM component 214 may then present the appropriate credentials and a network identifier of the virtual wireless communication network 204 to the first access point 206 to establish a connection with the virtual wireless communication network 204.

Similarly, a virtual wireless communication network connectivity management (VWCNCM) component 218 of the second access terminal 212 manages communication (as represented by a wireless signal symbol 220) between the second access terminal 212 and the second access point 208 of the virtual wireless communication network 204. Thus, the VWCNCM component 218 may identify the presence of the virtual wireless communication network 204 and present the appropriate credentials and a network identifier of the virtual wireless communication network 204 to the second access point 208 to establish a connection with the virtual wireless communication network 204.

Additional aspects of the disclosure will now be described with reference to FIGS. 3-8. For purposes of illustration, these figures may illustrate various components in the context of a 3GPP long term evolution (LTE) architecture. It should be appreciated, however, that the teachings herein may be employed in other types of radio technologies and architectures (e.g., 5G architectures, etc.). For purposes of illustration, various aspects of the disclosure may be described in the context of a DMVNO. It should be appreciated that any teachings relating to DMVNOs specifically, may be applicable to virtual wireless communication networks generally. Also, various operations may be described as being performed by specific types of components (e.g., UEs, servers, etc.). It should be understood that these operations can be performed by other types of devices. To reduce the complexity of these figures, only a few example components are shown. However, the teachings herein can be implemented using a different number of components or other types of components.

Example Architecture

Figure 3:
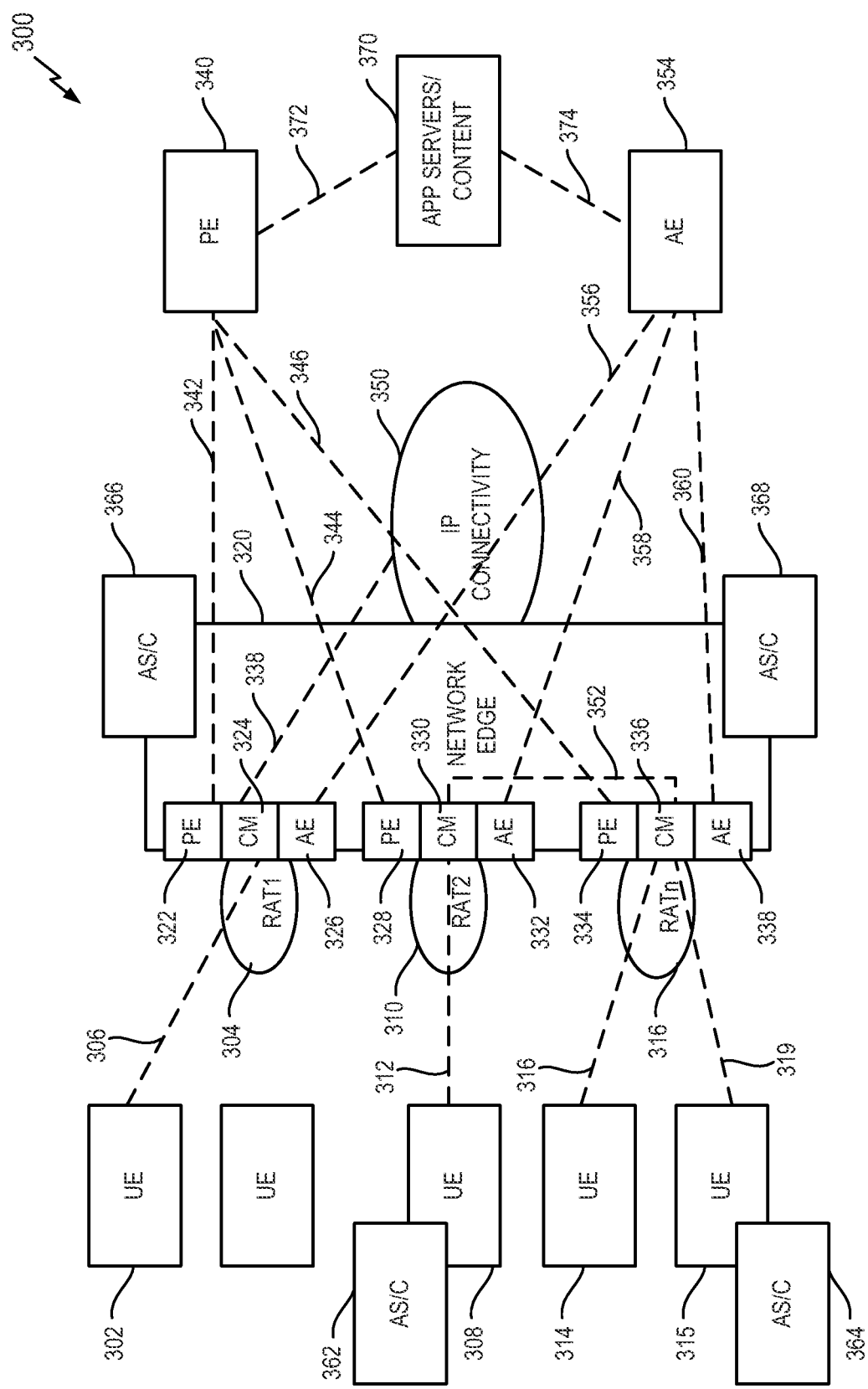
FIG. 3 illustrates an example of a network architecture within which aspects of the disclosure may be implemented.

FIG. 3 is a simplified example of a network architecture 300 within which one or more aspects of the disclosure may be implemented. The components of the architecture will be briefly described.

In the network architecture 300, UEs obtain network connectivity via various radio access technologies (RATs). For example, a first UE 302 communicates via a first RAT (RAT1) 304 as represented by a first dashed line 306. A second UE 308 communicates via a second RAT (RAT2) 310 as represented by a second dashed line 312. A third UE 314 communicates via an $n^{th}$ RAT (RATn) 316 as represented by a third dashed line 318. A fourth UE 315 communicates via the $n^{th}$ RAT (RATn) 316 as represented by a fourth dashed line 319.

In this simplified example, various functionality is described as being at the edge of the core network (the network edge 320). In particular, for the first RAT 304, this functionality includes a first policy engine (PE) 322, a first connectivity management (CM) 324, and a first authentication/authorization engine (AE or AAE) 326. For the second RAT 310, this functionality includes a second policy engine (PE) 328, a second connectivity management (CM) 330, and a second authentication/authorization engine (AE or AAE) 332. For the $n^{th}$ RAT 316, this functionality includes a third policy engine (PE) 334, a third connectivity management (CM) 336, and a third authentication/authorization engine (AE or AAE) 338.

In a policy engine, policing may be distributed and virtualized. This includes, without limitation, one or more of: charging or policing (e.g., traffic routing, differentiated traffic treatment, and so on). This functionality may be distributed, for example, as shown in FIG. 3. Connectivity between the first policy engine 322 and a fourth policy engine (PE) 340 is represented by a fifth dashed line 342. Connectivity between the second policy engine 328 and the fourth policy engine 340 is represented by a sixth dashed line 344. Connectivity between the third policy engine 334 and the fourth policy engine 340 is represented by a seventh dashed line 346.

In some aspects, the connectivity management of FIG. 3 is an evolution of a 3GPP mobility management entity (MME). Thus, the connectivity management can include, for example, keeping track of the current location of access terminals through the use of tracking areas, location areas, routing areas, or some other suitable technique; controlling paging for access terminals; and providing access control for access terminals. As represented by an eighth dashed line 348 in FIG. 3, the first connectivity management 324 enables IP connectivity 350 for UEs connected via the first RAT 304. As represented by a ninth dashed line 352, the second connectivity management 330 and the third connectivity management 336 enable connectivity between the second RAT 310 and the $n^{th}$ RAT 316.

In some aspects, an authentication/authorization engine (AE) of FIG. 3 is an evolution of conventional authentication, authorization, and accounting (AAA) with dynamic functionality. This dynamic functionality can include, without limitation, dynamic credentials and/or DMVNO. In some aspects, an AE may be an entity (e.g., in the operator network) that is in charge of dynamic subscription management.

The AE functionality may be distributed, for example, as shown in FIG. 3. Connectivity between the first AE 326 and a fourth AE 354 is represented by a tenth dashed line 356. Connectivity between the second AE 332 and the fourth AE 354 is represented by an eleventh dashed line 358. Connectivity between the third AE 338 and the fourth AE 354 is represented by a twelfth dashed line 360.

An access server/controller (AS/C) is a content provider, and includes application functionality including, without limitation, one or more of: sponsoring, authorization, creation of traffic policies and traffic routing, or credential provisioning. An access server/controller (AS/C) may be implemented at a UE, at the network edge, or some other location in a network. In the example of FIG. 3, a first AS/C 362 is implemented at the second UE 308, a second AS/C 364 is implemented at the fourth UE 315, a third AS/C 366 is implemented at the network edge 320, and a fourth AS/C 368 is implemented at the network edge 320.

The application (APP) servers and/or content 370 provide service and/or content for users of the network. In the example of FIG. 3, the APP servers and/or content 370 may be accessed via the fourth policy engine 340 as represented by a thirteenth dashed line 372. The APP servers and/or content 370 also may be accessed via the fourth AE 354 as represented by a fourteenth dashed line 374 in this example.

DMVNO

The use of a DMVNO as taught herein can provide one or more advantages over conventional wireless architectures. As one example, the DMVNO concept enables a device or service provider to establish an MVNO with a limited lifetime and/or dynamic features. As another example, a simpler and/or faster setup can be achieved in contrast with conventional mobile virtual network operator (MVNO) setup.

As another example, ad-hoc MVNOs can be established. For example, ad-hoc MVNOs can be established between devices. In roaming scenarios, one local device can establish an ad-hoc MVNO for temporary credential provisioning to one or more roaming devices.

As another example, ad-hoc MVNOs can be established by applications. A service provider or service owner (e.g., a social media website) can create ad-hoc networks for mobile groups belonging to a service owner (e.g., a social media group). As a specific example, Facebook can create ad-hoc networks for Facebook mobile groups belonging to a Facebook service.

As yet another example, ad-hoc MVNOs can be established by hosting entities. At a trade show or in some other scenario, a company can provide free connectivity to mobile devices by establishing an ad-hoc MVNO.

The use of a DMVNO as taught herein can leverage a radio access network (RAN) as a service for users and enterprise. Use of a DMVNO can enable a new business model to create a permanent, a semi-permanent, or a temporary MVNO using operator RAN and core network (CN) resources. DMVNOs are applicable to personal networks, enterprise networks, events, and local ad-hoc networks. Also, for a DMVNO, credentials can be provisioned to multiple devices based on one subscription.

In some aspects, a DMVNO is a new type of operator with at least one of the following characteristics: no dedicated infrastructure, no fixed service area, no spectrum assets, no fixed parameters such as a public land mobile network identifier (PLMNID), flexible and dynamic service provisioning, or flexible and dynamic service subscription management.

A DMVNO can serve customers by leveraging the resources of at least one of: a mobile network operator (MNO), a Wi-Fi network, a fixed internet access network, or some other type of communication network. A DMVNO can apply to scenarios such as, without limitation, one or more of: residential, personal, enterprise, stadium, event, or hotspot.

In some aspects, creation of a DMVNO that leverages an MNO may configure at least one of the following characteristics: (1) define a geographical coverage area—for example, the user may select a region on a map—there may be further information such as radio access technologies available to choose from in the region; (2) define the time period(s) that the network will provide services; (3) define a maximum amount of data available; (4) define parameters to identify the network (e.g., a network name); (5) define services and quality of service (QoS) profiles to be provided, e.g., per user and aggregated for the DMVNO; (6) use a pre-agreed format and protocols to exchange data with the MNO; or (7) the MNO pushes necessary updates to its network to support a DMVNO.

Also, as mentioned above, credentials for a DMVNO may be shared between devices. For example, a UE may securely confer DMVNO access credentials on other devices.

In general, the following operations may be employed to define, establish, and configure a DMVNO. It should be appreciated that these operations are for purposes of illustration and that other sets of operations can be employed to establish and configure a DMVNO in accordance with teachings herein.

In some scenarios, a user configures a DMVNO. For example, a user of a UE or other computing device can use a web interface or applications (e.g., an application shared between devices) to configure a DMVNO. This configuration can include managing any specific content or services to the cloud.

In some scenarios, an operator operations, administration, and management (OAM) entity configures the network to provide the service. A RAN may advertise the available service. The CN supports the policy and content, if applicable.

In some scenarios, other users are configured to join the DMVNO or manually select the service. For example, this may involve operations similar to conventional WLAN selection.

These and other operations will be described in more detail in conjunction with FIGS. 4-8. In some aspects, the operations of FIGS. 4-7 may be performed in succession, although this is not required.

DMVNO User Configuration

Figure 4:
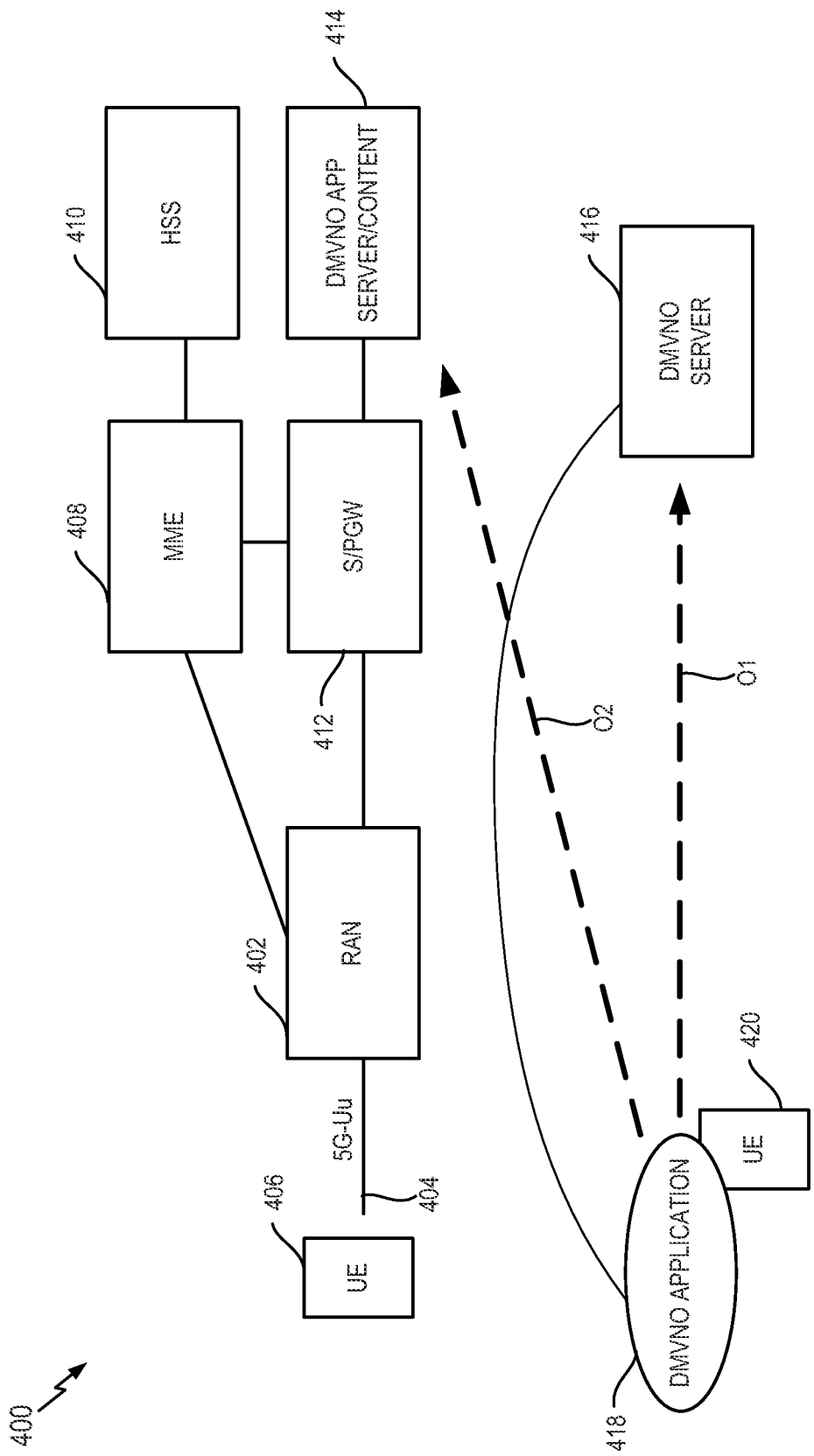
FIG. 4 illustrates an example of a DMVNO user configuration in accordance with some aspects of the disclosure.

FIG. 4 illustrates an example of DMVNO configuration operations from the perspective of a user (e.g., UE operations) that connects to a network 400. In this simplified example, representative components of the network 400 include a radio access network (RAN) 402 providing a 5G-Uu interface 404 to a first UE 406, a mobility management entity (MME) 408, a home subscriber server (HSS) 410, a serving gateway/packet data network (PDN) gateway (S/PGW) 412, a dynamic mobile virtual network operator (MVNO) application (APP) server/content 414, a DMVNO server 416, and a DMVNO application 418 executing on a second UE 420.

At a first operation represented by a first bold dashed line O1, a user connects to an operator server (MVNO server 416) to establish a DMVNO. Connecting to the operator server includes discovering whether the operator supports DMVNO creation, discovering the address of the MVNO server (e.g., based on information obtained at layer 2, in a PCO, or through a query-response mechanism between the UE and the network), discovering which Access Point Name the UE shall use for operation O1, and connecting to the discovered Access Point Name. For example, the user can select the location of the DMVNO (e.g., one or more cells, the current cell, a geographical location, a wide area, etc.), the time of the DMVNO (e.g., the lifetime of operation of the DMVNO), and the type of DMVNO. At an optional second operation represented by a second bold dashed line O2, the user uploads content or directs DMVNO traffic to a specific server (MVNO APP SERVER/CONTENT 414).

In conjunction with these operations, a user (e.g., the user's UE) may interact with a server or other network entity to authenticate and authorize the user. For example, authentication and/or authorization can be based on credentials the UE has with a network operator or, if DMVNO is to be sponsored by a third party, by credentials the UE received from the third party. Authentication and/or authorization may include interaction with a AAA server (not shown in FIG. 4) in the operator network for creation of credentials.

In some aspects, authentication and/or authorization may be based, at least in part, on the following assumptions and outcomes. Assuming that a UE that is establishing a DMVNO (hereafter referred to as the UE Main) has a trust relationship with an application/content provider, i.e., it is authorized to create DMVNOs (for either access or transport), and assuming the content provider has a trust relationship with a service provider, the UE Main can obtain dynamic credentials to access the service provider wireless transport.

Assuming the UE Main has a trust relationship with a service provider (e.g., AE), i.e., the UE Main is authorized to create DMVNOs (e.g., obtained through a specific content provider), and assuming the content provider has a trust relationship with the service provider, the UE Main can enable other UEs (that may or may not have valid credentials to access the service provider wireless transport) based on the UE Main's authorization. Thus, the capability is provided to dynamically and securely provide access and transport credentials to a UE. Moreover, dynamically created transport credentials may be used in addition to existing access credentials or as access credentials if the device does not have any valid ones or prefers to use the dynamic ones (e.g., a roaming device does not want to use roaming and gets dynamic credentials from the UE Main). Thus, separation can be achieved between access credentials and service (e.g., content) credentials. Moreover, credential and policy distribution to a UE may be enabled, along with key network functions. The network can also be enabled to differentiate traffic authorized by different sets of credentials.

DMVNO Operator Configuration

Figure 5:
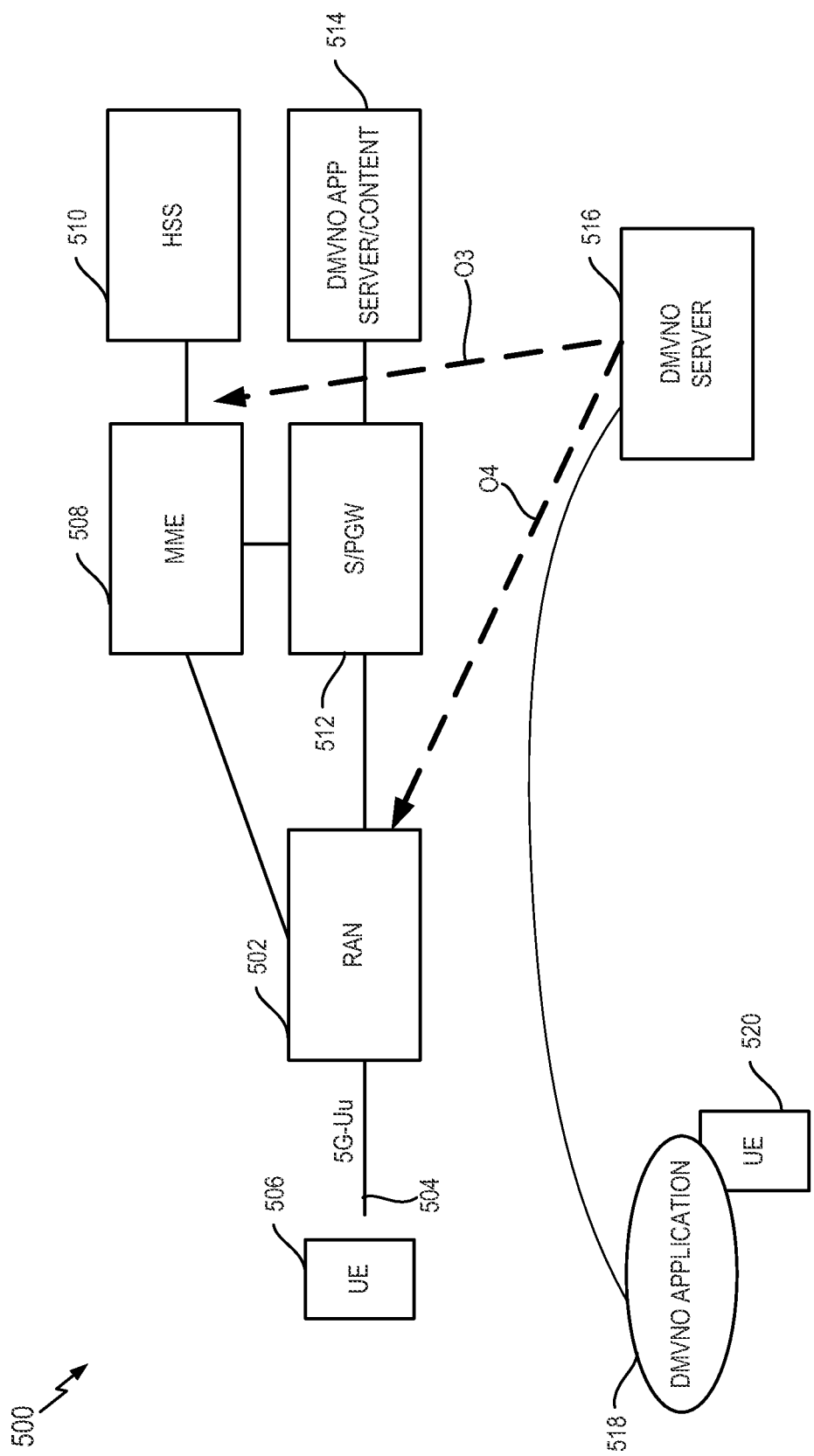
FIG. 5 illustrates an example of a DMVNO operator configuration in accordance with some aspects of the disclosure.

FIG. 5 illustrates an example of DMVNO configuration operations from the perspective of an operator (e.g., network node operations) of a network 500. In this simplified example, representative components of the network 500 are similar to those of FIG. 4 with corresponding reference numbers (or are the same components). The network 500 includes a RAN 502 providing a 5G-Uu interface 504 to a first UE 506, an MME 508, an HSS 510, an S/PGW 512, a DMVNO APP server/content 514, a DMVNO server 516, and a DMVNO application 518 executing on a second UE 520.

At a third operation represented by a third bold dashed line O3, an operator OAM configures the CN with policies to manage traffic to the DMVNO based on user configuration. For example, upon successful authorization of the second UE 520 (referred to as the UE Main), an operator can define policies including charging and traffic routing policies, generate connectivity configuration including the Access Point Names allowed to be used with the DMVNO, and generate credentials for members of the DMVNO being established. At a fourth operation represented by a fourth bold dashed line O4, the operator OAM configures select RAN nodes to advertise the MVNO.

In some aspects, DMVNO creation involves setting up the DMVNO on the RAN and CN, and setting up the DMVNO for use by the authorized users (e.g., setting up a personal DMVNO, P-DMVNO). On the RAN and CN, a DMVNO may be set up for a device with existing credentials or a device that does not have credentials. UE provisioning can involve enabling UEs to access the DMVNO (P-DMVNO).

Further with respect to setting up a DMVNO in the RAN, a UE or other device may connect to the operator network and create a DMVNO. As discussed herein, this can include configuration of location, time and appropriate RATs. This can be accomplished, for example, using an OTT solution, e.g., web-based or using an operator application. The operator then configures the appropriate RAN nodes to advertise the availability of the DMVNO. Various techniques may be employed to provide scalable network identification. This may involve, for example, determining a human readable network name if the DMVNO setup between the UE is manual and not based on inter-UE application exchanges, and network identification across RATs (e.g., WLAN). One technique involves the use of a wireless discovery protocol (WDP) over a radio link where a UE queries the network for a specific DMVNO or for a list of the supported DMVNOs. This can include an indication of DMVNO support and possibly a new system information block (SIB) with DMVNO network identifiers (IDs). Another technique involves UE provisioning, where a text-based ID is provided as part of the credentials that the UE uses to access the DMVNO. Discovery techniques could also be employed by devices to discover DMVNO information.

With respect to setting up a DMVNO in the CN, a UE or other device may connect to operator network and create a DMVNO. In some aspects, these operations include how to enable access and identify the users for which access is to be provided. These operations also may involve specifying policies and determining what traffic is allowed. The CN can create and distribute credentials and policies. Policies are distributed to/within the RAN and the CN (e.g., before the DMVNO is created, specific traffic for the device was not allowed).

With respect to enabling a UE to access a DMVNO, from the UE side, the UE is informed of credentials for access and other information including the Access Point Names to be used for connectivity with the DMVNO. For example, UE configuration may be done as part of the DMVNO creation process. In some implementations, a UE is configured with information about a DMVNO via a pre-installed app on the UE or via a web site that is accessed by the UE. From the network side, the network is informed of the UE credentials required for access.

DMVNO Discovery and Selection

Figure 6:
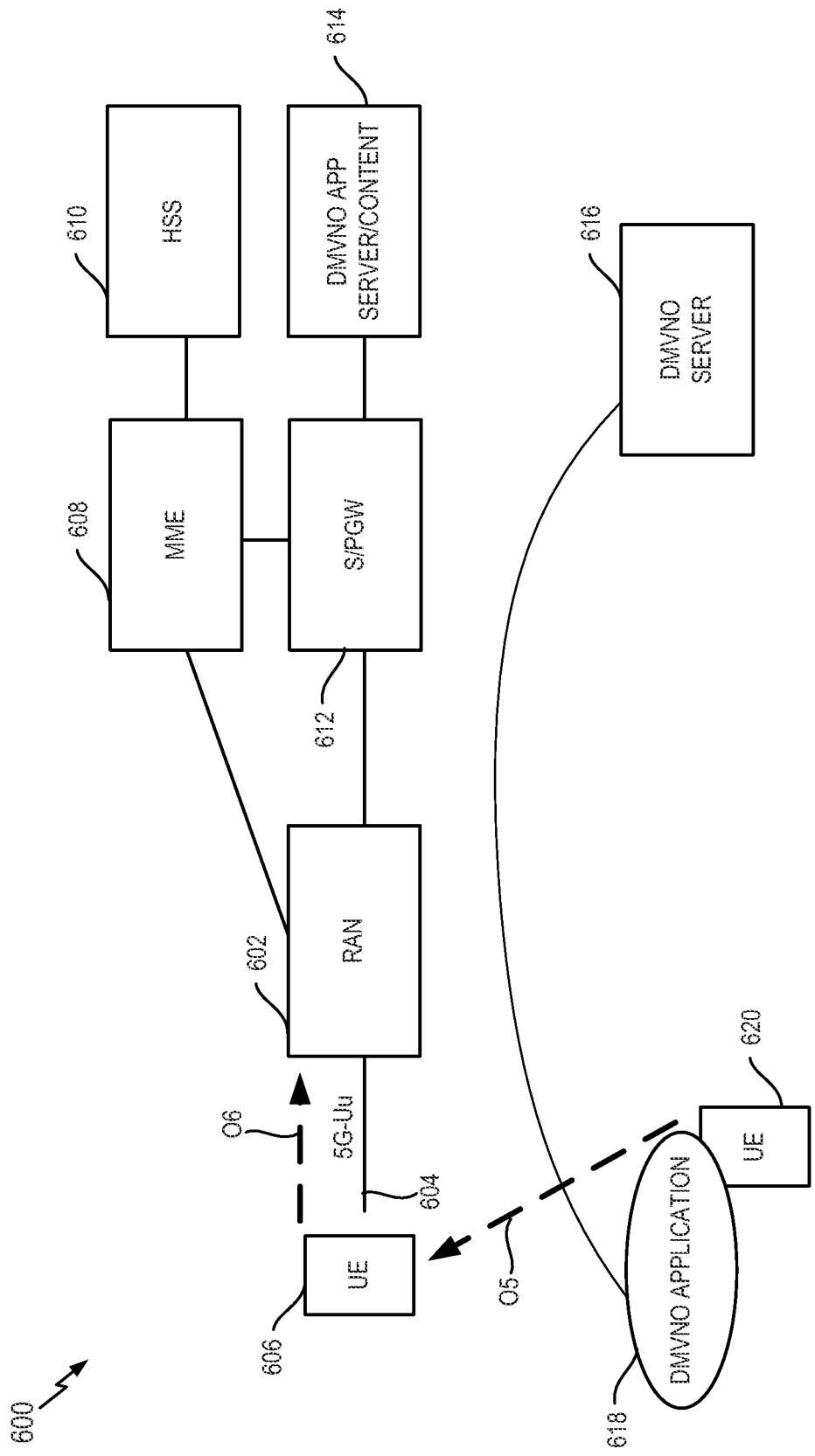
FIG. 6 illustrates an example of DMVNO discovery and selection in accordance with some aspects of the disclosure.

FIG. 6 illustrates an example of DMVNO discovery and selection operations in a network 600. In this simplified example, representative components of the network 600 are similar to those of FIGS. 4 and 5 with corresponding reference numbers (or are the same components). The network 600 includes a RAN 602 providing a 5G-Uu interface 604 to a first UE 606, an MME 608, an HSS 610, an S/PGW 612, a DMVNO APP server/content 614, a DMVNO server 616, and a DMVNO application 618 executing on a second UE 620.

At a fifth operation represented by a fifth bold dashed line O5, a user (the second UE 620) configures other devices (e.g., the first UE 606) with DMVNO-specific information (e.g., a DMVNO identifier, credentials to be used with the DMVNO, Access Point Names to be used with the DMVNO, etc.). At a sixth operation represented by a sixth bold dashed line O6, each configured device (e.g., the first UE 606) can perform discovery and selection with the RAN 602 to establish service with the DMVNO.

DMVNO Connection Establishment

Figure 7:
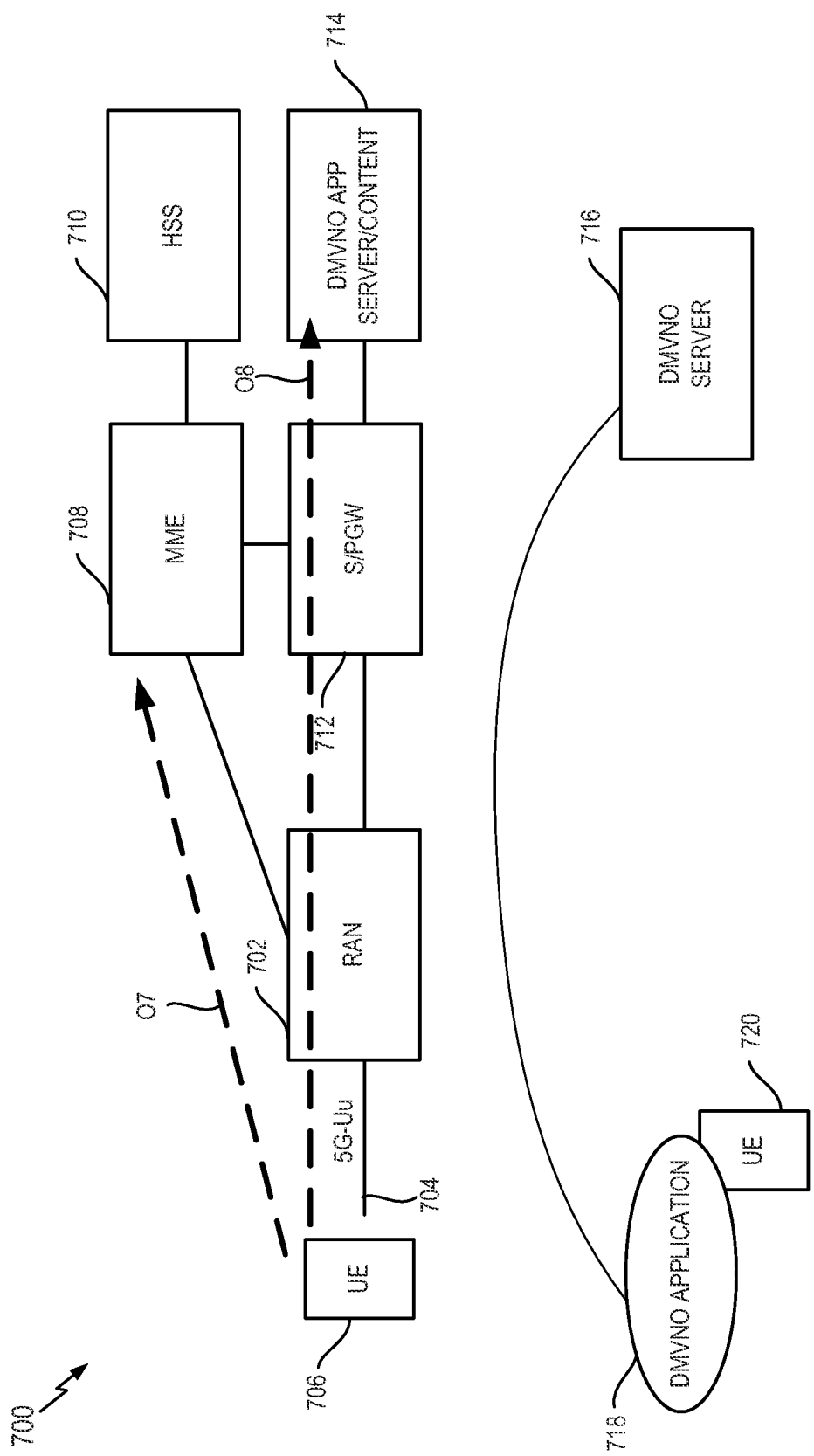
FIG. 7 illustrates an example of DMVNO connection establishment in accordance with some aspects of the disclosure.

FIG. 7 illustrates an example of DMVNO connection establishment operations in a network 700. In this simplified example, representative components of the network 700 are similar to those of FIGS. 4-6 with corresponding reference numbers (or are the same components). The network 700 includes a RAN 702 providing a 5G-Uu interface 704 to a first UE 706, an MME 708, an HSS 710, an S/PGW 712, a DMVNO APP server/content 714, a DMVNO server 716, and a DMVNO application 718 executing on a second UE 720.

At a seventh operation represented by a seventh bold dashed line O7, a device (the first UE 706) establishes a connection to a DMVNO via a configured RAN node. This includes discovering that the DMVNO is supported, and using the DMVNO identifier, the DMVNO credentials, the Access Point Name and other information obtained in operation O5. At an optional eighth operation represented by an eighth bold dashed line O8, the network can restrict device traffic (UE traffic in this example) to DMVNO-specific content and services.

DMVNO Architecture

Figure 8:
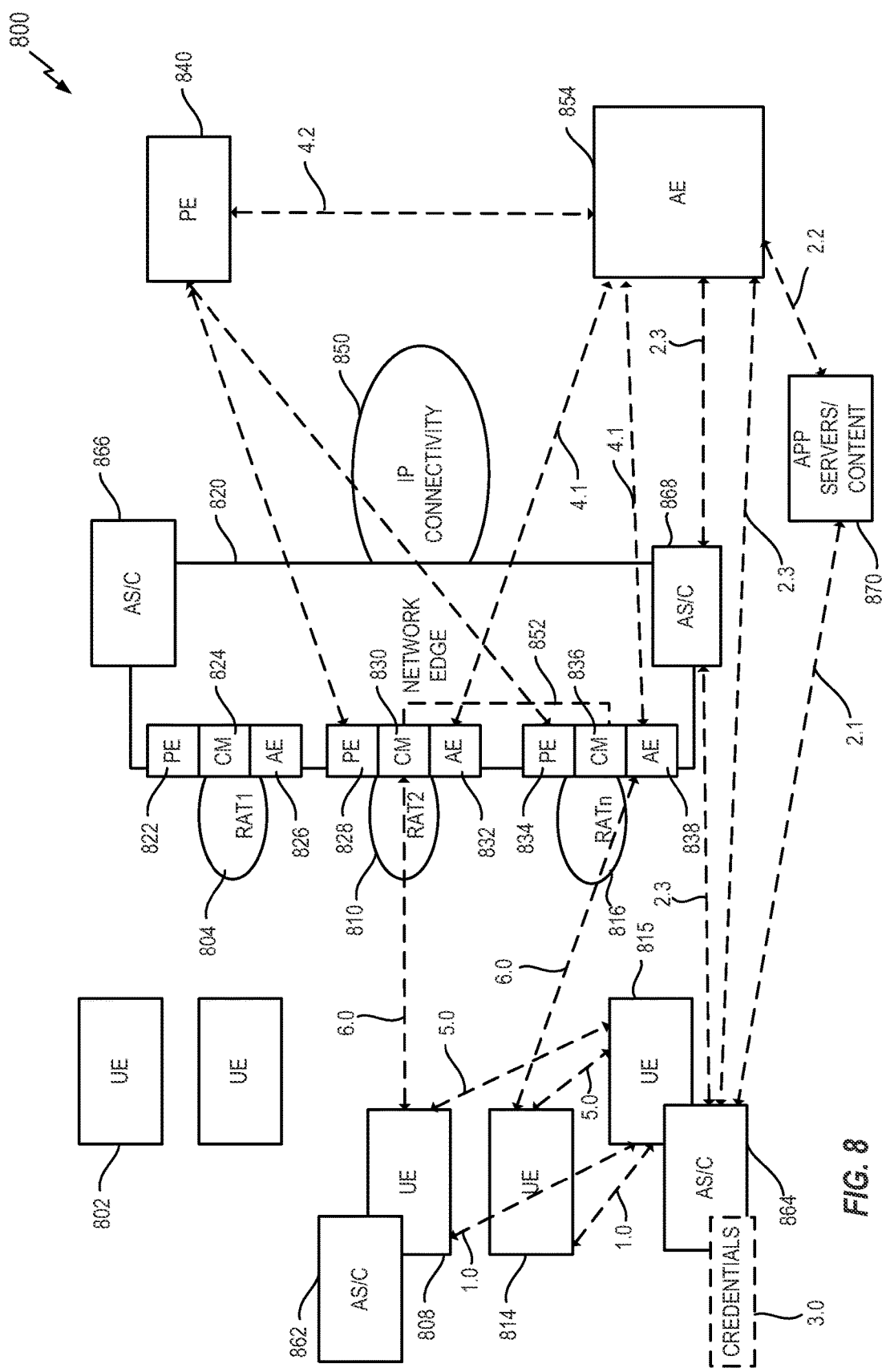
FIG. 8 illustrates an example of a DMVNO network architecture in accordance with some aspects of the disclosure.

FIG. 8 illustrates an example of a DMVNO architecture 800 implemented in accordance with some aspects of the disclosure. In this simplified example, representative components of the DMVNO architecture 800 are similar to those of FIG. 3 with corresponding reference numbers (or are the same components). The DMVNO architecture 800 includes a first UE 802, a second UE 808, a third UE 814, a fourth UE 815, a first RAT 804, a second RAT 810, an $n^{th}$ RAT 816, a network edge 820, IP connectivity 850, a first policy engine 822, a second policy engine 828, a third policy engine 834, a fourth policy engine 840, a first connectivity management 824, a second connectivity management 830, a third connectivity management 836, a first AE 826, a second AE 832, a third AE 838, a fourth AE 854, an APP SERVERS/CONTENT 870, a first AS/C 862, a second AS/C 864, a third AS/C 866, and a fourth AS/C 868.

The labeled operations in FIG. 8 illustrate an example of how the DMVNO architecture 800 may be used.

A first operation represented by first dashed lines 1.0 involves an exchange for DMVNO between users. For example, the fourth UE 815 creating the DMVNO may interact with one or more other UEs (e.g., the second UE 808 and the third UE 814) that will be allowed to access the DMVNO. This interaction may involve, for example, collecting the identities of the UEs.

A first part of a second operation represented by a second dashed line 2.1 involves UE interaction with one or more servers that support DMVNO setup to enable the UE to obtain authorization to establish a DMVNO. For example, the fourth UE 815 may interact with an external application server (the APP SERVERS/CONTENT 870 in this example) to request and, in turn, receive authorization for the DMVNO creation and to receive authorization. This authorization can take the form of, for example, an identity or token to be used with the fourth AE 854.

A second part of the second operation represented by a third dashed line 2.2 involves a server interacting with an AE (AAE) to authorize creation of a DMVNO. For example, an external server (the APP SERVERS/CONTENT 870 in this example) may authorize DMVNO creation and provide DMVNO information to the fourth AE 854.

A third part of the second operation represented by fourth dashed lines 2.3 involves UE interaction with an AE for DMVNO setup (e.g., through an AS/C) based on the UE's credentials. For example, the fourth UE 815 invokes the operation represented by fourth dashed lines 2.3 based on the information provided by the server (the APP SERVER/CONTENT 870 in this example) at the operation represented by the third dashed line 2.2. For example, at the operation represented by fourth dashed lines 2.3, the fourth UE 815 may provide DMVNO information to the fourth AE 854, whereupon the fourth AE 854 verifies the UE information to authorize the DMVNO.

At a third operation represented by credentials 3.0, a UE maintains a dynamic credential for other UEs and other information approved from the network. For example, the fourth UE 815 may obtain the information necessary to provide the second UE 808 and the third UE 814 with DMVNO information (e.g., a DMVNO ID).

A first part of a fourth operation represented by fifth dashed lines 4.1 involves the fourth AE 854 distributing DMVNO information to the appropriate function(s). For example, the information may be distributed based on location information provided by the fourth UE 815.

A second part of the fourth operation represented by a sixth dashed line 4.2 involves the fourth AE 854 distributing DMVNO policies to the policy engine(s). For example, new policies for DMVNO traffic may be routed to the fourth policy engine 840 and/or one or more of the other policy engines (e.g., the policy engines 828 and 834).

A fifth operation represented by seventh dashed lines 5.0 involves the fourth UE 815 distributing DMVNO information (e.g., a DMVNO ID) to other UEs (the second UE 808 and the third UE 814 in this example). In some implementations, this information is distributed in a secure (e.g., encrypted) manner.

A sixth operation represented by eighth dashed lines 6.0 involves the other UEs (the second UE 808 and the third UE 814 in this example) discovering DMVNO support and requesting connection to the DMVNO corresponding to the DMVNO ID.

Additional Aspects

With the above in mind, several additional examples of aspects of dynamic subscription creation, dynamic content management, DMVNO establishment, and dynamic policing management will now be treated.

Creation of a dynamic subscription (e.g., DMVNO) from the perspective of a DMVNO creator (e.g., a device such as a UE that is used to establish a DMVNO) can include one or more of the operations that follow. An establishing device may discover support for DMVNO establishment (e.g., at a wireless communication network). The device may discover the Access Point Name to be used to establish the DMVNO. The device may also discover an address of the DMVNO (e.g., an address of a DMVNO server or some other entity that supports establishment of the DMVNO). The device may connect to a network functionality to establish DMVNO. The network functionality can be in the hosting operator, a third party server that connects to the operator, or some other entity. The device may negotiate with the network to define dynamic subscription features. The subscription features may include, without limitation, at least one of: location restrictions (e.g., unrestricted, restricted to a geographic location, restricted to a cell, etc.), access restrictions (e.g., Wi-Fi only, etc.), traffic management (e.g., traffic to be sent to a local breakout), or a type of dynamic subscription. The device may provide to the network a list of devices or subscribers that are authorized to access the DMVNO. The device can advertise the DMVNO to other devices, e.g., through an application or via peer-to-peer (P2P) connectivity (e.g., Wi-Fi, near-field communication (NFC), or some other suitable form of communication).

Management of dynamic content from the perspective of a DMVNO creator (e.g., a device such as a UE) can include one or more of the operations that follow. The device may negotiate with the network regarding information on traffic limiting. For example, the device may upload content for consumption by the devices that use the DMVNO subscription. As another example, the device may send information that indicates how traffic is to be directed from devices using the dynamic subscription to a specific server. In this way, the traffic can be restricted, if desired.

Establishment of a DMVNO from the perspective of a network can include one or more of the operations that follow. The network may advertise support for DMVNO establishment. For example, this support may be: broadcast at a protocol Layer 2; indicated to a device (e.g., a UE) upon a query from the device; or provided via an indication in protocol configuration option (PCO) information element (IE). The PCO IE can be provided, for example, at connectivity establishment (e.g., when a packet data network (PDN) connection is created). The network may also provide to the device the Access Point Name to be used to connect to the DMVNO server. This Access Point Name may be provided, for example, upon a query from the device, or in a response (e.g., a rejection) to a device request for connectivity including an establishment cause indicating DMVNO establishment, or via an indication in a PCO (e.g., at connectivity establishment, when a PDN connection is created, etc.). The network may also provide to the device the address of the DMVNO server. This address may be provided, for example, upon a query from the device, or via an indication in a PCO (e.g., at connectivity establishment, when a PDN connection is created). The network authorizes the device request and assigns a DMVNO ID, and returns the DMVNO ID to the device that initiates the creation of the DMVNO.

Dynamic policing management from the perspective of a network can include one or more of the operations that follow. An operator (e.g., a server managing the DMVNOs) pushes DMVNO information to RAN nodes, access nodes, and core network nodes. This information can include, without limitation, at least one of: an identity of the dynamic subscription (DMVNO ID); traffic handling information (e.g., QoS, policing, traffic routing information—e.g., to a local breakout or to specific traffic handling network nodes or servers, Access Point Names authorized for the DMVNO, etc.); information provided to the whole network; or information provided only to RAN nodes covering a specific location.

The operator (e.g., the server managing the DMVNOs) configures the CN with policies to manage traffic to the DMVNO based on user configuration. Thus, the operator can distribute policy control (e.g., charging traffic policing, traffic re-routing) information to dedicated entities. This includes the DMVNO ID. When traffic associated to the DMVNO ID is processed by the policy control functions, the specific DMVNO ID policies are applied. Upon receiving DMVNO information, the RAN advertises the support of the DMVNO in the agreed location. The DMVNO can be identified, for example, as a public land mobile network (PLMN) or as a specific identifier (ID).

In view of the above, the disclosure relates in some aspects to operating a virtual wireless communications network. In some aspects, this includes: defining parameters of the network, including geographical coverage area, time of operation, network name, service(s) to be provided, etc.; and communicating these parameters to at least one other network operator, and possibly to more than one other network operator. The other operator(s) may provide services via cellular, Wi-Fi, fixed access technologies, or other access technologies.

In addition, the disclosure relates in some aspects to creating a virtual wireless communications network. In some aspects, this includes: after the other network(s) have securely received configuration parameters, operations, administration, and maintenance (OA&M) procedures are employed to create the virtual wireless communications network. The other network(s) will also generate and share credentials for end devices to access the virtual wireless communications network. At the completion of this process, the virtual wireless communications network will be available in the defined geography and during the desired time period to provide services to devices with proper credentials.

Example Processes

With the above in mind, several examples of processes that may be employed in conjunction with the teachings herein will now be described with reference to FIGS. 9-17. The processes of FIGS. 9-17 may be employed, for example, in conjunction with any of the other operations described herein. For example, the processes of FIGS. 9-17 describe operations that may be optionally employed in conjunction with one of more of the processes of FIG. 19 or FIG. 21 or the structure or code of FIG. 18 or FIG. 20.

Figure 9:
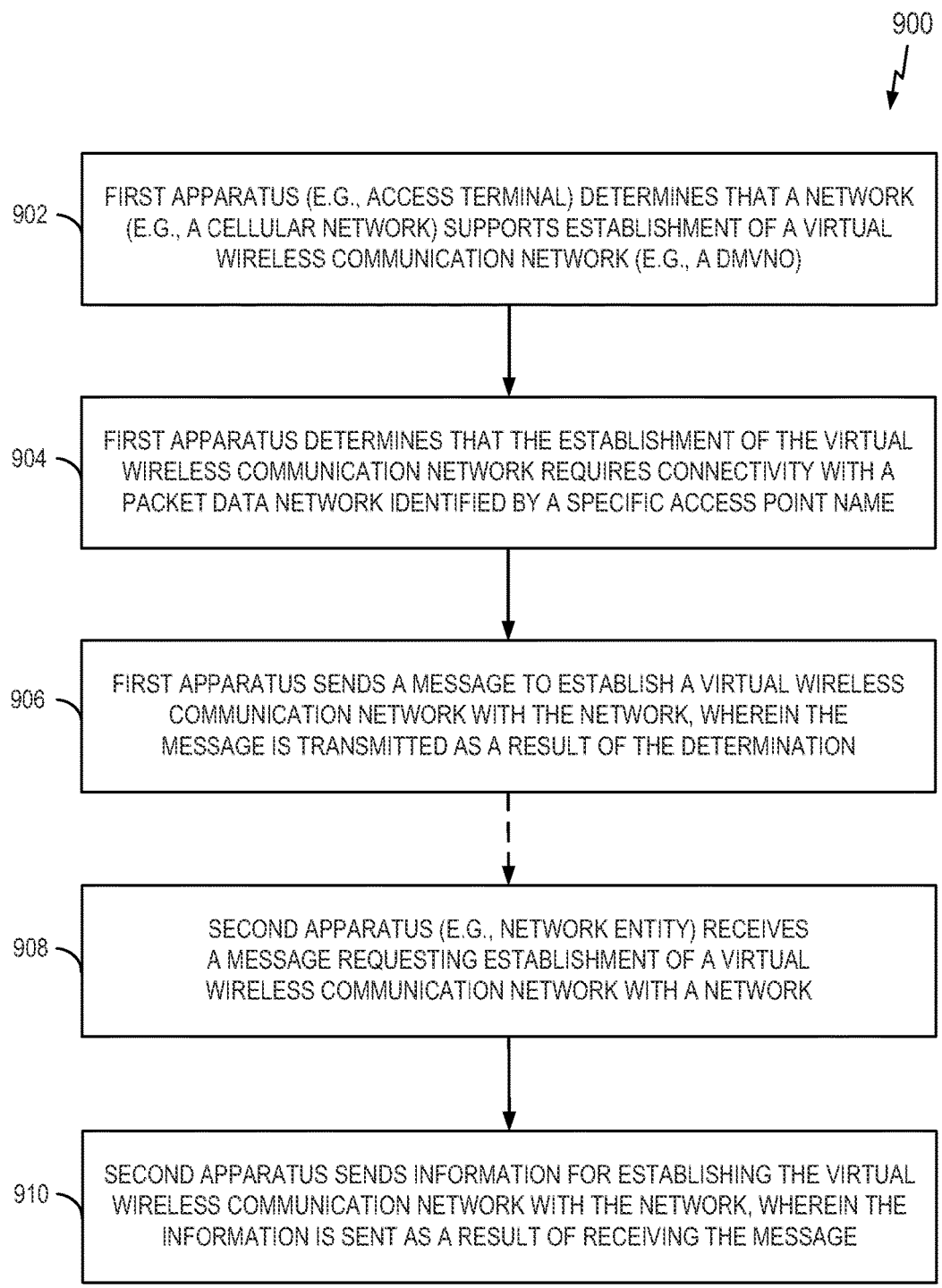
FIG. 9 illustrates an example of a process for establishing a virtual wireless communication network in accordance with some aspects of the disclosure.

FIG. 9 illustrates a process 900 for establishing a virtual wireless communication network in accordance with some aspects of the disclosure. The operations of the process 900 may be implemented by any suitable apparatuses capable of supporting virtual wireless communication network-related operations.

At block 902, a first apparatus determines that a network supports establishment of a virtual wireless communication network (e.g., a DMVNO). For example, a UE may receive an indication that the network supports DMVNO via broadcast signaling or other signaling.

At block 904, the first apparatus determines that the establishment of a virtual wireless communication network (e.g., a DMVNO) requires connectivity with a packet data network identified by a specific Access Point Name. For example, a UE may receive an indication that a specific Access Point Name should be used in layer 2 signaling, in a PCO, upon a query from the apparatus, or in a response (e.g., a rejection) to a device request for connectivity including an establishment cause indicating DMVNO establishment, or via an indication in a PCO (e.g., at connectivity establishment, when a PDN connection is created).

At block 906, the first apparatus sends a message to establish a virtual wireless communication network with the network. For example, a UE may send a message to a server that authorizes the creation of a DMVNO. As another example, a UE may send a message to an authentication entity to set up a DMVNO. In some aspects, the message is transmitted as a result of the determination of block 902. In some aspects, the address of a network entity (e.g., a server) for establishing the virtual wireless communication network is received by the first apparatus and the message is sent to a network entity using the received address.

At block 908, a second apparatus receives a message requesting establishment of a DMVNO with a network (e.g., the message sent at block 904). For example, a network entity (e.g., a DMVNO server or an authentication entity) may receive such a message from a UE.

At block 910, the second apparatus sends information for establishing the DMVNO with the network. For example, a network entity (e.g., a DMVNO server or an authentication entity) may send this information to a requesting UE. This information may include, for example, a credential indicating that the UE is authorized to establish a DMVNO and/or parameters for a DMVNO. In some aspects, the information is sent as a result of receiving the message at block 906.

Figure 10:
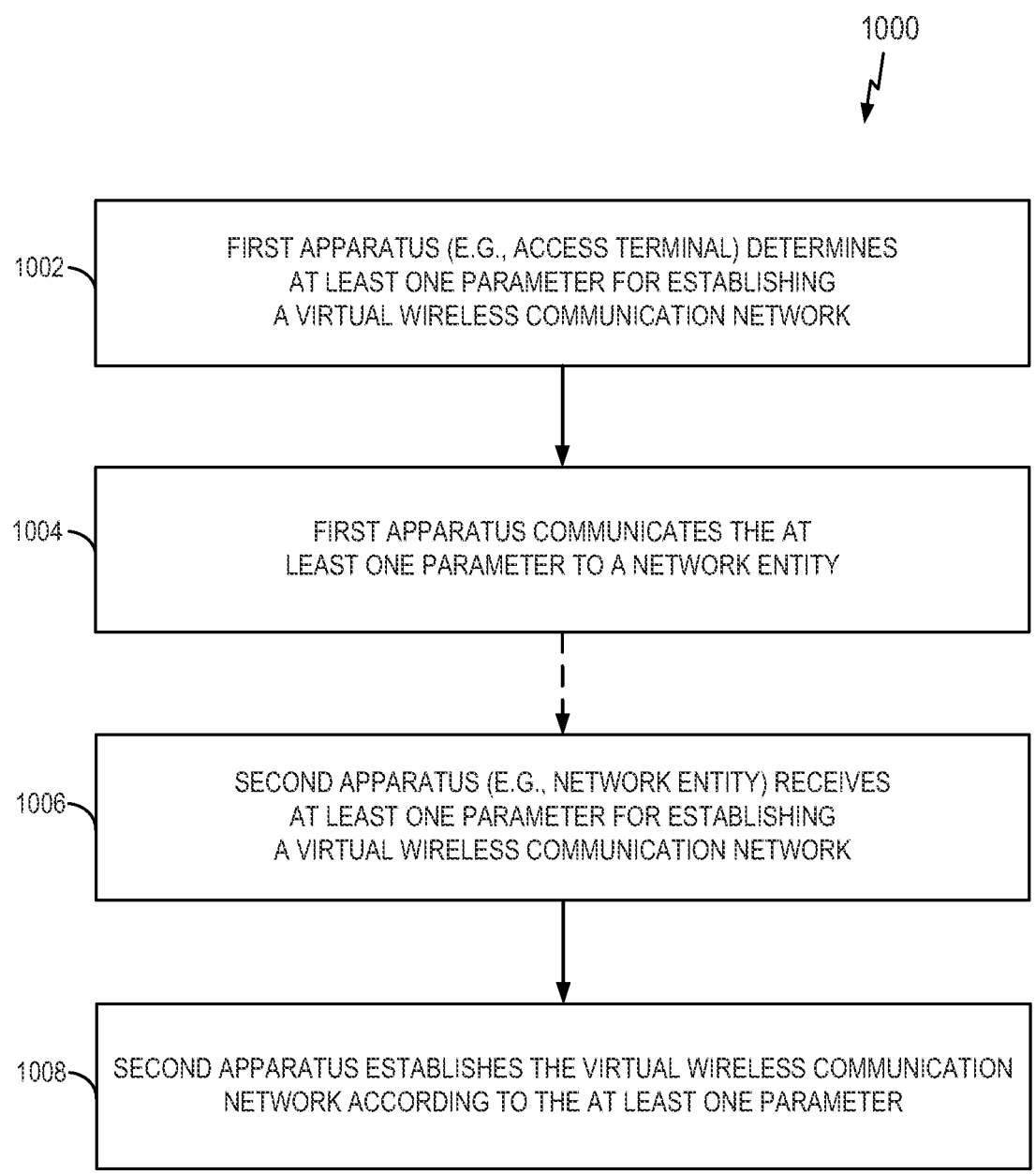
FIG. 10 illustrates another example of a process for establishing a virtual wireless communication network in accordance with some aspects of the disclosure.

FIG. 10 illustrates a process 1000 for establishing a virtual wireless communication network in accordance with some aspects of the disclosure. The operations of the process 1000 may be implemented by any suitable apparatuses capable of supporting virtual wireless communication network-related operations.

At block 1002, a first apparatus determines at least one parameter for establishing a virtual wireless communication network (e.g., a DMVNO). For example, a UE may select at least one of: a list of devices authorized to access the virtual wireless communication network, a location restriction for the virtual wireless communication network, a geographical coverage area for the virtual wireless communication network, an access restriction for the virtual wireless communication network, traffic management for the virtual wireless communication network, a subscription type for the virtual wireless communication network, a name for the virtual wireless communication network, time of operation for the virtual wireless communication network, the Access Point Names to be used for the virtual wireless communication network, services provided by the virtual wireless communication network, or a virtual wireless communication network type.

At block 1004, the first apparatus communicates the at least one parameter to a network entity. For example, a UE may send a request including the at least one parameter to a server to initiate the creation of a virtual wireless communication network. As another example, a UE may send a message to an authentication entity to setup a virtual wireless communication network. In some aspects, the network entity includes at least one of: a server; an operations, administration, and management entity; or an entity of a wireless communication network that provides connectivity for the virtual wireless communication network. In some aspects, the operations of block 1004 are performed as a result of the determination of block 902 of FIG. 9.

At block 1006, a second apparatus receives at least one parameter for establishing a virtual wireless communication network (e.g., the at least one parameter communicated at block 1004). For example, a network entity (e.g., a DMVNO server or an authentication entity) may receive from a UE a request to establish a virtual wireless communication network.

At block 1008, the second apparatus establishes the virtual wireless communication network according to the at least one parameter. For example, a network entity (e.g., a DMVNO server or an authentication entity) may verify that the UE is authorized to establish a virtual wireless communication network and, if so, the network entity establishes the virtual wireless communication network (e.g., as discussed herein) based on one or more parameters received from the UE and, optionally, one or more parameters specified by the network.

Figure 11:
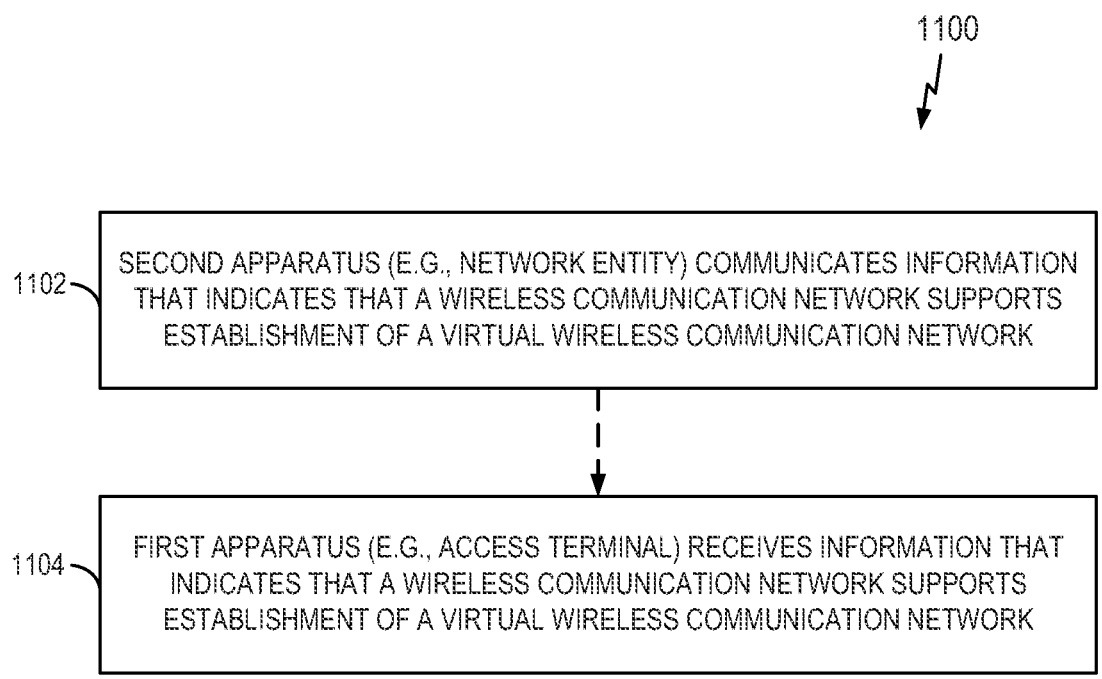
FIG. 11 illustrates an example of a process for communicating information for establishing a virtual wireless communication network in accordance with some aspects of the disclosure.

FIG. 11 illustrates a process 1100 for communicating information in conjunction with establishing a virtual wireless communication network in accordance with some aspects of the disclosure. The operations of the process 1100 may be implemented by any suitable apparatuses capable of supporting virtual wireless communication network-related operations.

At block 1102, a second apparatus communicates information that indicates that a network supports establishment of the virtual wireless communication network (e.g., a DMVNO). For example, a network entity (e.g., an access point) may send an indication that the network supports a DMVNO via broadcast signaling or other signaling. In some aspects, this information is communicated via a response to a query (e.g., from an access terminal). In some aspects, the information is communicated via at least one of: a broadcast signal, a layer 2 signal, a connection establishment communication, or a protocol configuration option (PCO) information element (IE).

At block 1104, a first apparatus receives the information that indicates that the network supports establishment of the virtual wireless communication network. For example, an access terminal may receive the information communicated at block 1102. In some aspects, the receipt of this information is part of the determination of block 902 of FIG. 9. This may include an indication of the Access Point Name to be used to establish connectivity to exchange communications for the establishment of the virtual wireless communication network.

Figure 12:
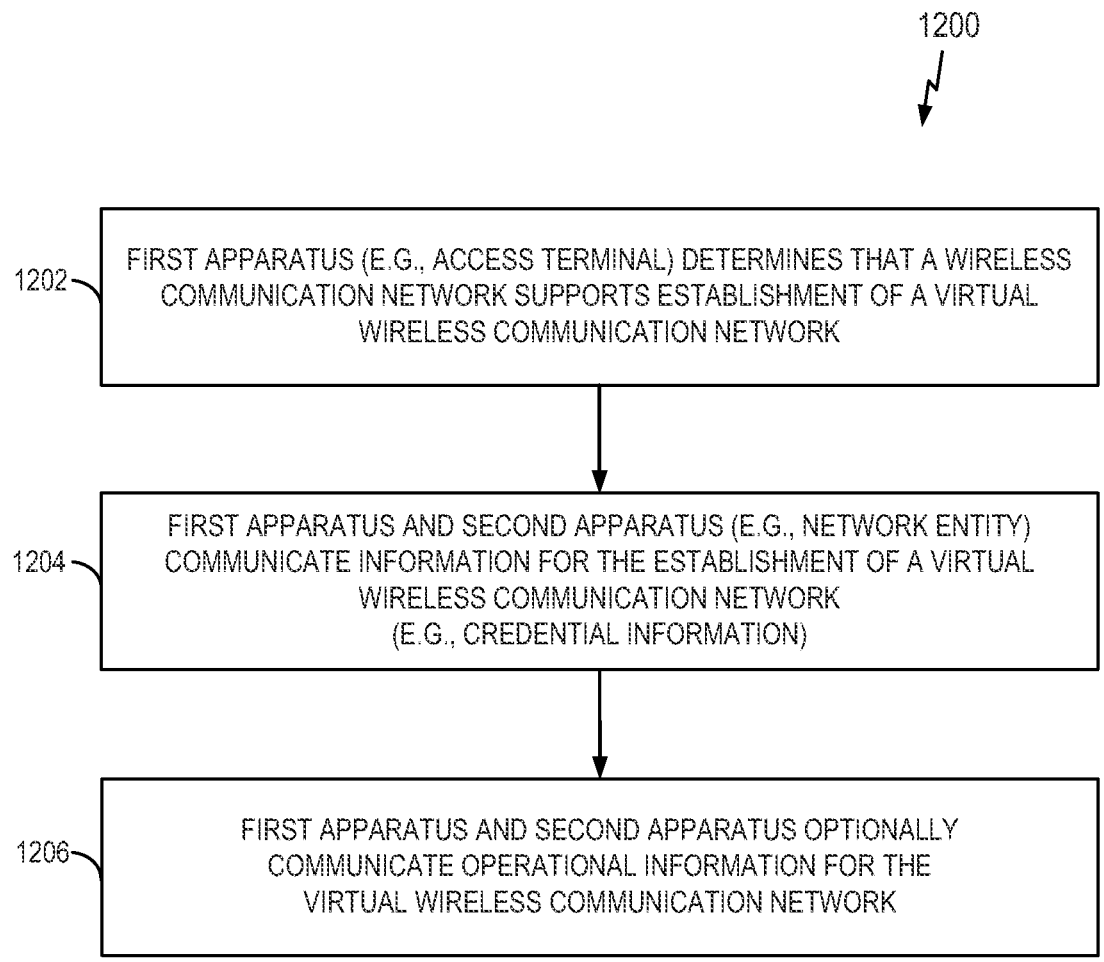
FIG. 12 illustrates another example of a process for communicating information for establishing a virtual wireless communication network in accordance with some aspects of the disclosure.

FIG. 12 illustrates another process 1200 for communicating information in conjunction with establishing a virtual wireless communication network in accordance with some aspects of the disclosure. This includes determining the Access Point Name to be used to establish connectivity to exchange communications for the establishment of the virtual wireless communication network. The operations of the process 1200 may be implemented by any suitable apparatuses capable of supporting virtual wireless communication network-related operations.

At block 1202, a first apparatus determines that a wireless communication network supports establishment of a virtual wireless communication network. For example, an access terminal may determine that a wireless communication network supports establishment of a DMVNO. Thus, the operations of block 1202 may correspond to the operations of block 902 of FIG. 9.

At block 1204, the first apparatus and a second apparatus communicate information for the establishment of the virtual wireless communication network. For example, an access terminal and a network entity may cooperate to establish a DMVNO. In some aspects, this information is communicated via a response to a message (e.g., a query from an access terminal).

In some aspects, the information includes at least one of: authentication information that authorizes establishment of a DMVNO, an identifier of a DMVNO, a location restriction for a DMVNO, an access restriction for a DMVNO, a traffic management criterion for a DMVNO, the Access Point Names to be used with the DMVNO, or a subscription type for a DMVNO.

In some aspects, a network entity (e.g., an AE or AAE) sends credential information to an access terminal at block 1204. The credential information may include, for example, at least one of: authentication information that authorizes a device to establish the virtual wireless communication network, or an identifier of the virtual wireless communication network.

At block 1206, the first apparatus and a second apparatus optionally communicate operational information for the virtual wireless communication network. For example, a network entity may send the operational information to at least one of: a radio access network (RAN) node (e.g., an access point) or a wireless access node (e.g., an access terminal). In some aspects, the operational information includes at least one of: traffic handling information for the virtual wireless communication network, virtual wireless communication network information designated for nodes at a specified location, policy for managing virtual wireless communication network traffic according to user configuration, or charging policy for the virtual wireless communication network.

Figure 13:
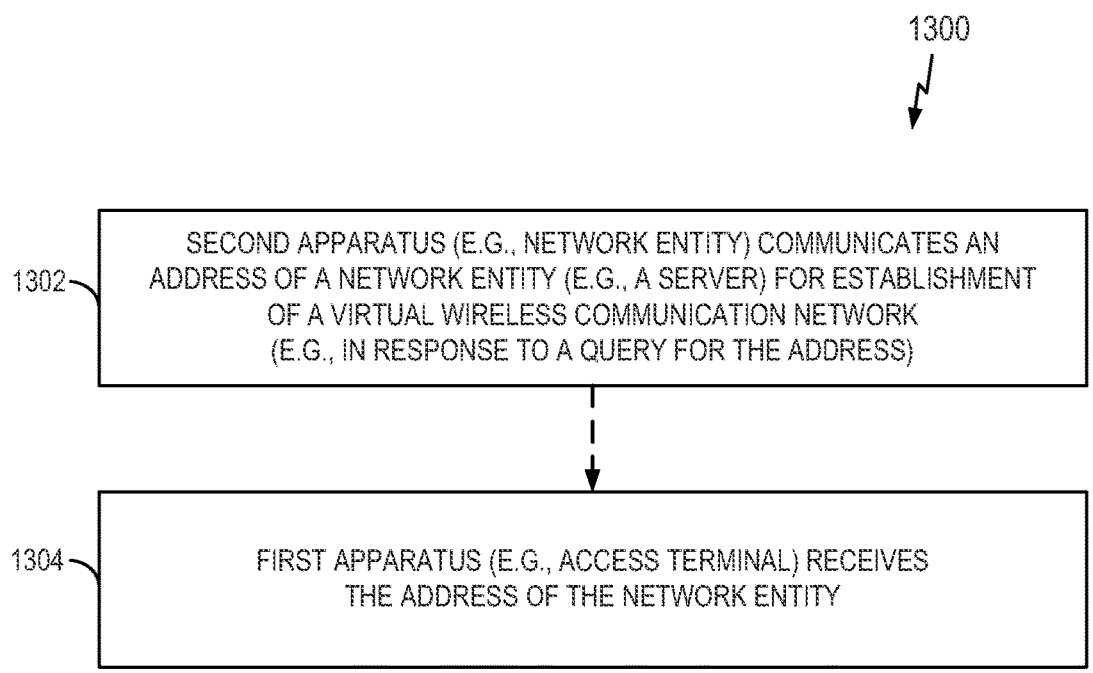
FIG. 13 illustrates an example of a process for communicating an address for establishing a virtual wireless communication network in accordance with some aspects of the disclosure.

FIG. 13 illustrates another process 1300 for communicating address information in conjunction with establishing a virtual wireless communication network in accordance with some aspects of the disclosure. The operations of the process 1300 may be implemented by any suitable apparatuses capable of supporting virtual wireless communication network-related operations.

At block 1302, a second apparatus communicates an address of a network entity for establishing the virtual wireless communication network (e.g., a DMVNO). For example, another network entity may send an address of a DMVNO server to an access terminal. In some aspects, the address is sent via at least one of: a response to a query for the address, a broadcast signal, a connection establishment communication, or a protocol configuration option (PCO) information element (IE).

At block 1304, a first apparatus receives the address of the network entity. For example, an access terminal may receive the address communicated at block 1302. In some aspects, this address is received via a response to a message (e.g., in response to a query from an access terminal).

Figure 14:
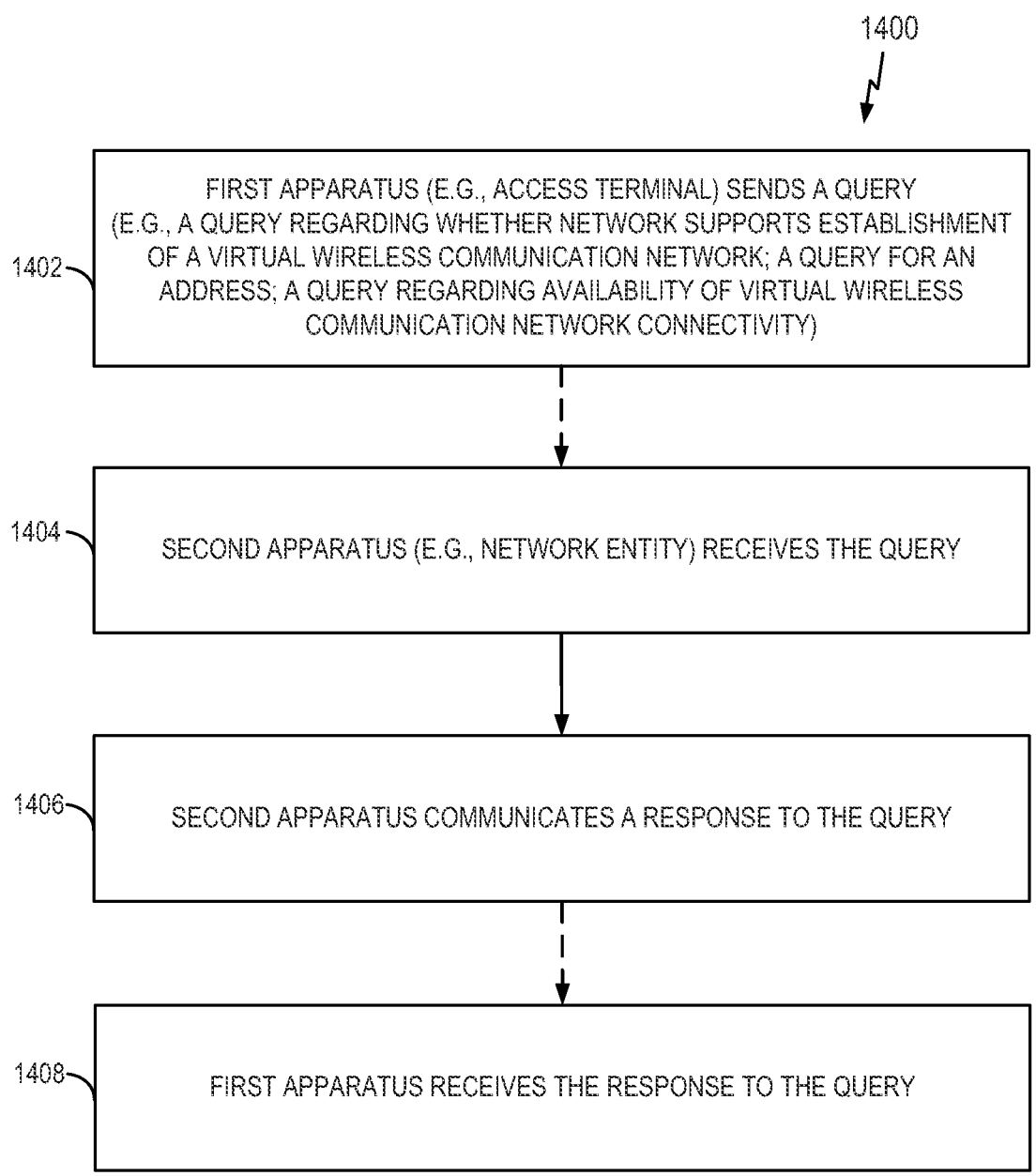
FIG. 14 illustrates an example of a query and response process in accordance with some aspects of the disclosure.

FIG. 14 illustrates a query-response process 1400 in accordance with some aspects of the disclosure. The operations of the process 1400 may be implemented by any suitable apparatuses capable of supporting virtual wireless communication network-related operations.

At block 1402, a first apparatus sends a query. For example, an access terminal may send a query to a network entity. In some scenarios, a query regarding whether a network supports establishment of a virtual wireless communication network is sent at block 1402. In some scenarios, the query is for an address of a network entity (e.g., as in block 1304 of FIG. 13). In some scenarios, a query regarding the availability of virtual wireless communication network connectivity is sent at block 1402.

At block 1404, a second apparatus (e.g., a network entity) receives the query.

At block 1406, the second apparatus communicates a response to the query. In some scenarios, the response indicates whether a network supports establishment of a virtual wireless communication network. In some scenarios, the response includes a requested address. In some scenarios, the response involves advertising the availability of virtual wireless communication network connectivity. In some scenarios, the response involves advertising the Access Point Name to be used to establish connectivity to exchange communications for the establishment of the virtual wireless communication network.

At block 1408, the first apparatus receives the response to the query. The first apparatus may thus take action upon receipt of the response as discussed herein.

Figure 15:
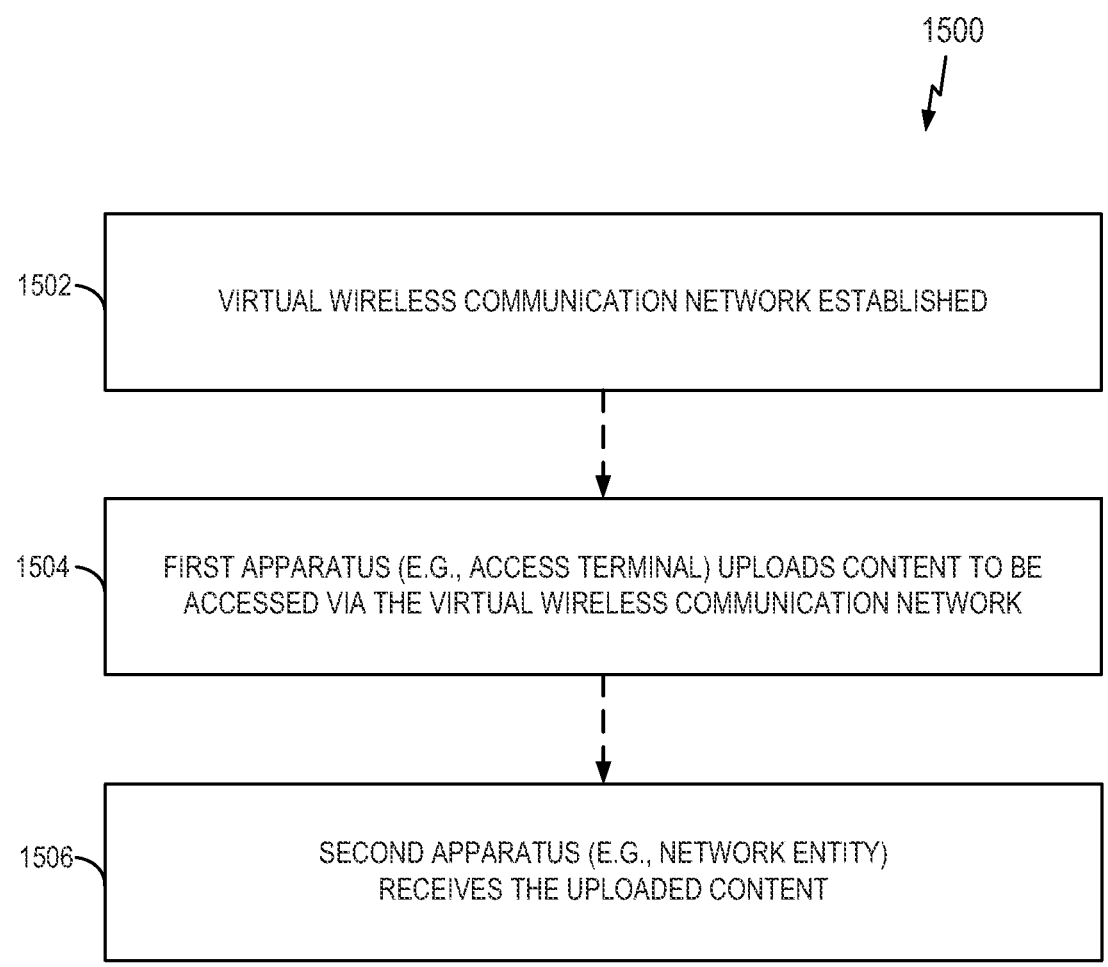
FIG. 15 illustrates an example of a process for uploading content to a virtual wireless communication network in accordance with some aspects of the disclosure.

FIG. 15 illustrates a process 1500 for uploading content in accordance with some aspects of the disclosure. The operations of the process 1500 may be implemented by any suitable apparatuses capable of supporting virtual wireless communication network-related operations.

At block 1502, a virtual wireless communication network is established. For example, an access terminal may have requested that a network establish a virtual wireless communication network according to one or more parameters supplied by the access terminal as discussed herein.

At block 1504, a first apparatus uploads content to be accessed via the virtual wireless communication network. For example, an access terminal may upload this information to a DMVNO server.

At block 1506, a second apparatus receives the uploaded content. For example, the content may be stored at a DMVNO server for subsequent access by any devices that are authorized to access the DMVNO.

Figure 16:
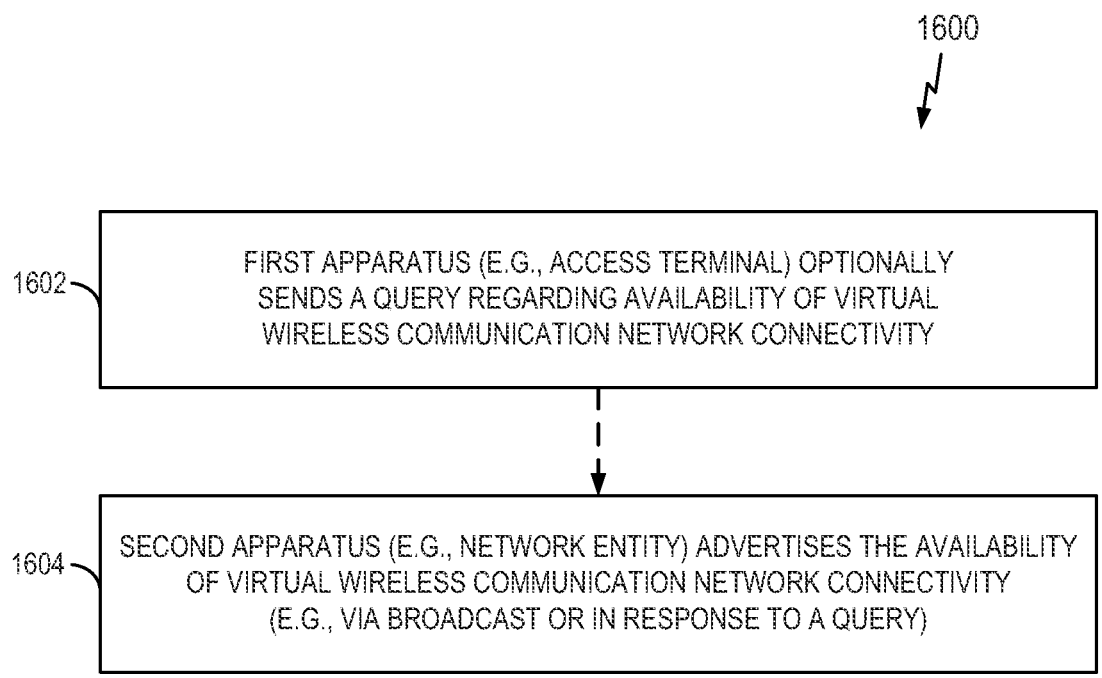
FIG. 16 illustrates an example of a process for advertising availability of a virtual wireless communication network in accordance with some aspects of the disclosure.

FIG. 16 illustrates a process 1600 for advertising network availability in accordance with some aspects of the disclosure. The operations of the process 1600 may be implemented by any suitable apparatuses capable of supporting virtual wireless communication network-related operations.

At block 1602, a first apparatus optionally sends a query. For example, an access terminal may send a query to a network entity regarding the availability of virtual wireless communication network connectivity. As another example, an access terminal may send a query regarding the availability of a specific virtual wireless communication network connectivity by providing the identifier of one or more virtual wireless communication networks.

At block 1604, the second apparatus advertises the availability of virtual wireless communication network connectivity. For example, a network entity (e.g., an access point) may advertise this availability via broadcast signaling or in response to the query of block 1602. As another example, a network entity may advertise this availability by providing a list of the virtual wireless communication networks supported.

Figure 17:
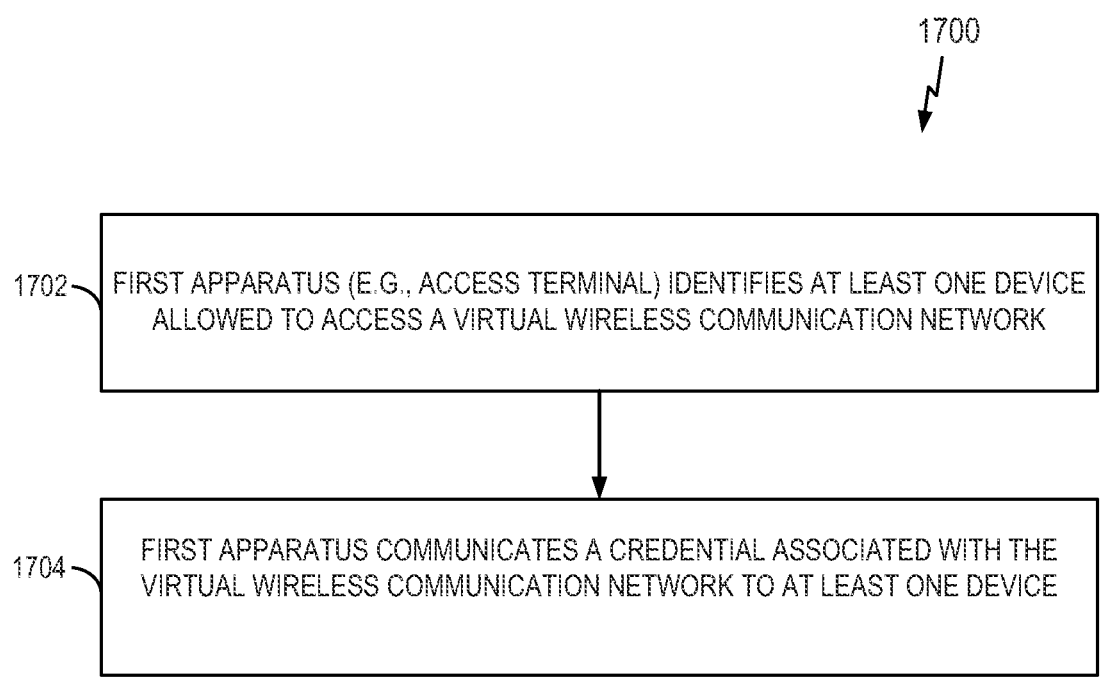
FIG. 17 illustrates an example of a process for communicating a credential for a virtual wireless communication network in accordance with some aspects of the disclosure.

FIG. 17 illustrates a process 1700 for communicating a credential in accordance with some aspects of the disclosure. The operations of the process 1700 may be implemented by any suitable apparatus capable of supporting virtual wireless communication network-related operations.

At block 1702, a first apparatus identifies at least one device allowed to access the virtual wireless communication network. For example, an access terminal may identify other access terminals in a group (e.g., a subscription group) that are allowed to access the virtual wireless communication network.

At block 1704, the first apparatus communicates a credential associated with the virtual wireless communication network to the at least one device identified at block 1702. For example, an access terminal may send an identifier of the virtual wireless communication network to the other access terminals.

First Example Electronic Device

Figure 18:
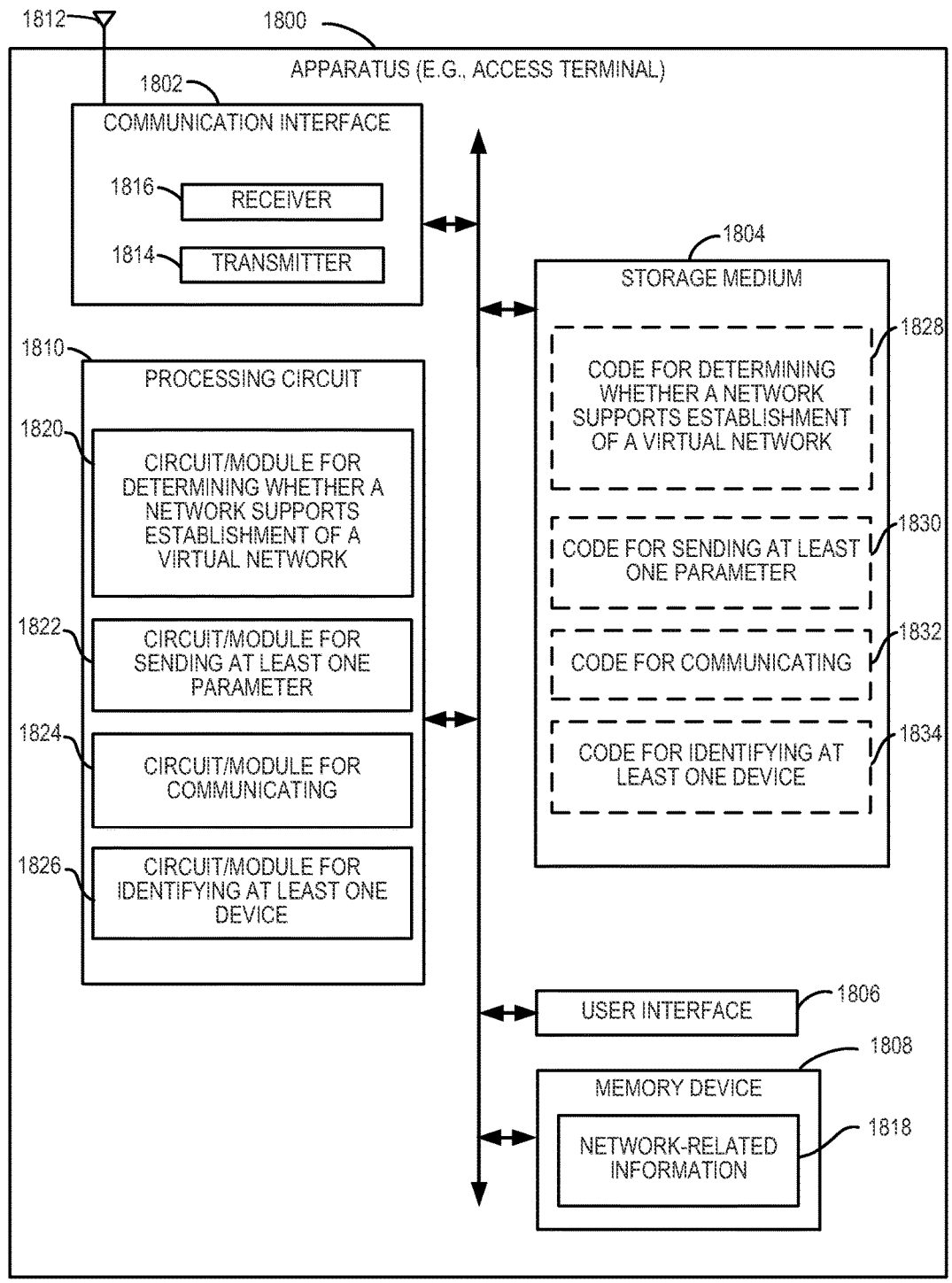
FIG. 18 illustrates a block diagram of an example hardware implementation for an electronic device that supports multiple access virtual wireless communication network-related functionality in accordance with some aspects of the disclosure.

FIG. 18 is an illustration of an apparatus 1800 configured to support virtual network operations according to one or more aspects of the disclosure. The apparatus 1800 includes a communication interface (e.g., at least one transceiver) 1802, a storage medium 1804, a user interface 1806, a memory device 1808, and a processing circuit 1810.

These components can be coupled to and/or placed in electrical communication with one another via a signaling bus or other suitable component, represented generally by the connection lines in FIG. 18. The signaling bus may include any number of interconnecting buses and bridges depending on the specific application of the processing circuit 1810 and the overall design constraints. The signaling bus links together various circuits such that each of the communication interface 1802, the storage medium 1804, the user interface 1806, and the memory device 1808 are coupled to and/or in electrical communication with the processing circuit 1810. The signaling bus may also link various other circuits (not shown) such as timing sources, peripherals, voltage regulators, and power management circuits, which are well known in the art, and therefore, will not be described any further.

The communication interface 1802 may be adapted to facilitate wireless communication of the apparatus 1800. For example, the communication interface 1802 may include circuitry and/or code (e.g., instructions) adapted to facilitate the communication of information bi-directionally with respect to one or more communication devices in a network. The communication interface 1802 may be coupled to one or more antennas 1812 for wireless communication within a wireless communication system. The communication interface 1802 can be configured with one or more standalone receivers and/or transmitters, as well as one or more transceivers. In the illustrated example, the communication interface 1802 includes a transmitter 1814 and a receiver 1816.

The memory device 1808 may represent one or more memory devices. As indicated, the memory device 1808 may maintain network-related information 1818 along with other information used by the apparatus 1800. In some implementations, the memory device 1808 and the storage medium 1804 are implemented as a common memory component. The memory device 1808 may also be used for storing data that is manipulated by the processing circuit 1810 or some other component of the apparatus 1800.

The storage medium 1804 may represent one or more computer-readable, machine-readable, and/or processor-readable devices for storing code, such as processor executable code or instructions (e.g., software, firmware), electronic data, databases, or other digital information. The storage medium 1804 may also be used for storing data that is manipulated by the processing circuit 1810 when executing code. The storage medium 1804 may be any available media that can be accessed by a general purpose or special purpose processor, including portable or fixed storage devices, optical storage devices, and various other mediums capable of storing, containing or carrying code.

By way of example and not limitation, the storage medium 1804 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1804 may be embodied in an article of manufacture (e.g., a computer program product). By way of example, a computer program product may include a computer-readable medium in packaging materials. In view of the above, in some implementations, the storage medium 1804 may be a non-transitory (e.g., tangible) storage medium.

The storage medium 1804 may be coupled to the processing circuit 1810 such that the processing circuit 1810 can read information from, and write information to, the storage medium 1804. That is, the storage medium 1804 can be coupled to the processing circuit 1810 so that the storage medium 1804 is at least accessible by the processing circuit 1810, including examples where at least one storage medium is integral to the processing circuit 1810 and/or examples where at least one storage medium is separate from the processing circuit 1810 (e.g., resident in the apparatus 1800, external to the apparatus 1800, distributed across multiple entities, etc.).

Code stored by the storage medium 1804, when executed by the processing circuit 1810, causes the processing circuit 1810 to perform one or more of the various functions and/or process operations described herein. For example, the storage medium 1804 may include operations configured for regulating operations at one or more hardware blocks of the processing circuit 1810, as well as to utilize the communication interface 1802 for wireless communication utilizing their respective communication protocols.

The processing circuit 1810 is generally adapted for processing, including the execution of such code stored on the storage medium 1804. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1810 is arranged to obtain, process and/or send data, control data access and storage, issue commands, and control other desired operations. The processing circuit 1810 may include circuitry configured to implement desired code provided by appropriate media in at least one example. For example, the processing circuit 1810 may be implemented as one or more processors, one or more controllers, and/or other structure configured to execute executable code. Examples of the processing circuit 1810 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1810 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1810 are for illustration and other suitable configurations within the scope of the disclosure are also contemplated.

According to one or more aspects of the disclosure, the processing circuit 1810 may be adapted to perform any or all of the features, processes, functions, operations and/or routines for any or all of the apparatuses described herein. As used herein, the term "adapted" in relation to the processing circuit 1810 may refer to the processing circuit 1810 being one or more of configured, employed, implemented, and/or programmed to perform a particular process, function, operation and/or routine according to various features described herein.

According to at least one example of the apparatus 1800, the processing circuit 1810 may include one or more of a circuit/module for determining whether a network supports establishment of a virtual network 1820, a circuit/module for sending at least one parameter 1822, a circuit/module for communicating 1824, and a circuit/module for identifying at least one device 1826.

The circuit/module for determining whether a network supports establishment of a virtual network 1820 may include circuitry and/or code (e.g., code for determining whether a network supports establishment of a virtual network 1828 stored on the storage medium 1804) adapted to perform several functions relating to, for example, determining whether a first wireless communication network supports establishment of a multiple access virtual wireless communication network. Initially, the circuit/module for determining whether a network supports establishment of a virtual network 1820 obtains information indicative of whether establishment of a virtual network is supported. For example, the circuit/module for determining whether a network supports establishment of a virtual network 1820 may obtain this information directly from a component of the apparatus 1800 (e.g., the receiver 1816, the memory device 1808, or some other component). In some implementations, the circuit/module for determining whether a network supports establishment of a virtual network 1820 sends a query and receives a response as discussed herein. In some implementations, the circuit/module for determining whether a network supports establishment of a virtual network 1820 monitors advertisements (e.g., broadcast by access points) as discussed herein. In some implementations, the circuit/module for determining whether a network supports establishment of a virtual network 1820 processes the obtained information (e.g., to identify a yes or no response). The circuit/module for determining whether a network supports establishment of a virtual network 1820 then outputs an indication of whether the network supports establishment of a virtual network (e.g., stores the indication in the memory device 1808 or sends the indication to another component of the apparatus 1800).

The circuit/module for sending at least one parameter 1822 may include circuitry and/or code (e.g., code for sending at least one parameter 1830 stored on the storage medium 1804) adapted to perform several functions relating to, for example, sending at least one parameter to the first wireless communication network, wherein the at least one parameter is for the establishment of the multiple access virtual wireless communication network and the at least one parameter is sent as a result of the determination of the circuit/module for determining whether a network supports establishment of a virtual network 1820. Upon receiving an indication of this determination, the circuit/module for sending at least one parameter 1822 obtains the parameter(s). For example, the circuit/module for sending at least one parameter 1822 may obtain a parameter directly from a component of the apparatus 1800 (e.g., the memory device 1808, or some other component). The circuit/module for sending at least one parameter 1822 then sends the parameter(s) directly to the ultimate destination (e.g., if the circuit/module for sending at least one parameter 1822 includes a transmitter) or sends the parameter(s) to another component (e.g., the transmitter 1814) for transmission to another device (e.g., a network entity).

The circuit/module for communicating 1824 may include circuitry and/or code (e.g., code for communicating 1832 stored on the storage medium 1804) adapted to perform several functions relating to, for example, communicating credential information. In some aspects, the credential information is for the establishment of a multiple access virtual wireless communication network. In some aspects, a credential associated with a multiple access virtual wireless communication network is communicated to at least one device. In some implementations, this involves obtaining credential information from a component of the apparatus 1800. Upon obtaining the credential information, the circuit/module for communicating 1824 then sends the credential information directly to the ultimate destination (e.g., if the circuit/module for communicating 1824 includes a transmitter) or sends the credential information to another component (e.g., the transmitter 1814) for transmission to another device (e.g., another access terminal).

The circuit/module for identifying at least one device 1826 may include circuitry and/or code (e.g., code for identifying at least one device 1834 stored on the storage medium 1804) adapted to perform several functions relating to, for example, identifying at least one device allowed to access the multiple access virtual wireless communication network. In some implementations, this involves obtaining corresponding information from a component of the apparatus 1800 (e.g., a database including a list of allowed devices). In some implementations, this involves querying a device to determine whether the device is allowed to access the network. Upon obtaining the information, the circuit/module for identifying at least one device 1826 sends an indication of the identified device(s) to another component of the apparatus 1800 (e.g., the memory device 1808).

As mentioned above, code stored by the storage medium 1804, when executed by the processing circuit 1810, causes the processing circuit 1810 to perform one or more of the various functions and/or process operations described herein. For example, the storage medium 1804 may include one or more of the code for determining whether a network supports establishment of a virtual network 1828, the code for sending at least one parameter 1830, the code for communicating 1832, and the code for identifying at least one device 1834.

Example Process

Figure 19:
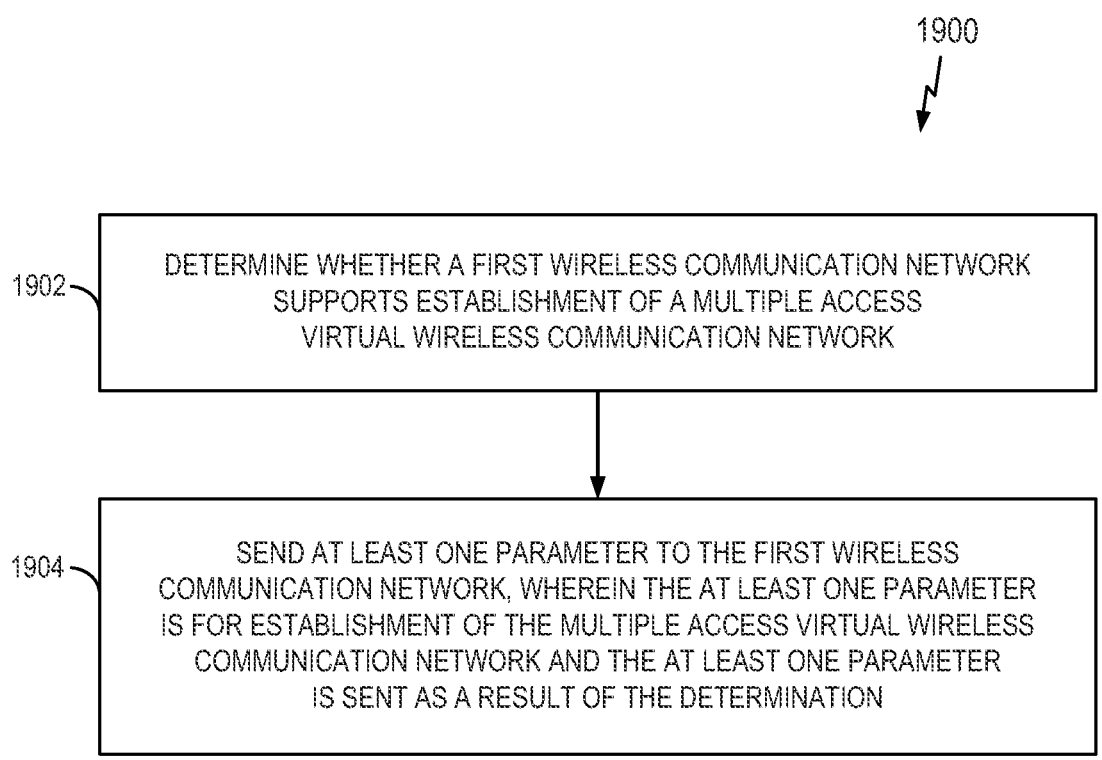
FIG. 19 illustrates an example of a process for sending a parameter to establish a multiple access virtual wireless communication network in accordance with some aspects of the disclosure.

FIG. 19 illustrates a process 1900 for establishing a virtual wireless communication network in accordance with some aspects of the disclosure. The process 1900 may take place within a processing circuit (e.g., the processing circuit 1810 of FIG. 18), which may be located in an access terminal (e.g., a mobile device), or some other suitable apparatus. Of course, in various aspects within the scope of the disclosure, the process 1900 may be implemented by any suitable apparatus capable of supporting virtual wireless communication network-related operations.

At block 1902, a determination is made as to whether a first wireless communication network supports establishment of a multiple access virtual wireless communication network. In some aspects, the determination includes receiving information that indicates that the first wireless communication network supports the establishment of the multiple access virtual wireless communication network. For example, an access terminal may receive the information in a message (e.g., an advertisement) from the first wireless communication network or some other entity. In some aspects, the information may be received via at least one of: a broadcast signal, a layer 2 signal, a connection establishment communication, or a protocol configuration option (PCO) information element (IE). In some aspects, the determination of block 1902 includes establishing a connection with the first wireless communication network and receiving the above information from the first wireless communication network. Alternatively, the determination of block 1902 may be made prior to establishing a connection with the first wireless communication network. In some aspects, the determination of block 1902 includes connecting to another interface (e.g., other than the first wireless communication network) to receive the information.

In some aspects, the determination includes: sending a query regarding whether the first wireless communication network supports the establishment of the multiple access virtual wireless communication network; and receiving a response to the query, wherein the response indicates that the first wireless communication network supports the establishment of the multiple access virtual wireless communication network.

In some aspects, the multiple access virtual wireless communication network is a dynamic mobile virtual network operator (DMVNO). In some aspects, the at least one parameter includes traffic management information for the multiple access virtual wireless communication network.

At block 1904, at least one parameter is sent to the first wireless communication network. In some aspects, the at least one parameter is for the establishment of the multiple access virtual wireless communication network and the at least one parameter is sent as a result of the determination of block 1902. In some aspects, the at least one parameter is sent via a connection established with the first wireless communication network. In some aspects, the at least one parameter is sent via another interface (e.g., other than the first wireless communication network) to establish the multiple access virtual wireless communication network.

In some aspects, the at least one parameter includes at least one of: a list of devices authorized to access the multiple access virtual wireless communication network, a location restriction for the multiple access virtual wireless communication network, a geographical coverage area for the multiple access virtual wireless communication network, an access restriction for the multiple access virtual wireless communication network, a subscription type for the multiple access virtual wireless communication network, a name for the multiple access virtual wireless communication network, time of operation for the multiple access virtual wireless communication network, services provided by the multiple access virtual wireless communication network, or a multiple access virtual wireless communication network type.

In some aspects, credential information for the establishment of the multiple access virtual wireless communication network is also communicated; and the credential information includes at least one of: authentication information that authorizes a device to establish the multiple access virtual wireless communication network, or an identifier of the multiple access virtual wireless communication network.

In some aspects, at least one device (e.g., an access terminal) allowed to access the multiple access virtual wireless communication network is also identified. In this case, a credential associated with the multiple access virtual wireless communication network may be communicated to the at least one device.

Second Example Electronic Device

Figure 20:
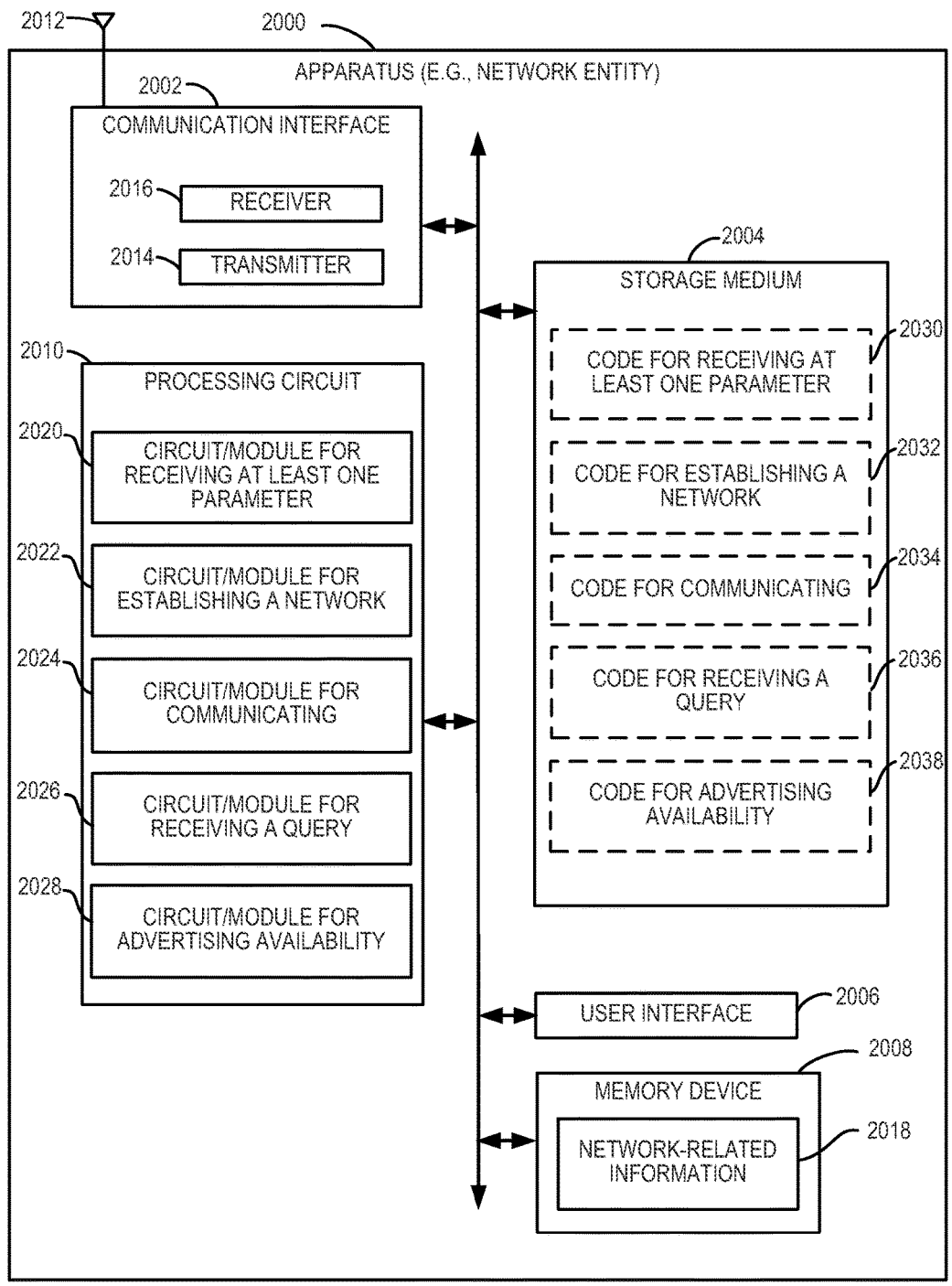
FIG. 20 illustrates a block diagram of another example hardware implementation for an electronic device that supports multiple access virtual wireless communication network-related functionality in accordance with some aspects of the disclosure.

FIG. 20 is an illustration of another apparatus 2000 configured to support virtual network operations according to one or more aspects of the disclosure. The apparatus 2000 includes a communication interface (e.g., at least one transceiver) 2002, a storage medium 2004, a user interface 2006, a memory device 2008, and a processing circuit 2010.

These components can be coupled to and/or placed in electrical communication with one another via a signaling bus or other suitable component, represented generally by the connection lines in FIG. 20. The signaling bus may include any number of interconnecting buses and bridges depending on the specific application of the processing circuit 2010 and the overall design constraints. The signaling bus links together various circuits such that each of the communication interface 2002, the storage medium 2004, the user interface 2006, and the memory device 2008 are coupled to and/or in electrical communication with the processing circuit 2010. The signaling bus may also link various other circuits (not shown) such as timing sources, peripherals, voltage regulators, and power management circuits, which are well known in the art, and therefore, will not be described any further.

The communication interface 2002 may be adapted to facilitate wireless communication of the apparatus 2000. For example, the communication interface 2002 may include circuitry and/or code (e.g., instructions) adapted to facilitate the communication of information bi-directionally with respect to one or more communication devices in a network. The communication interface 2002 may be coupled to one or more antennas 2012 for wireless communication within a wireless communication system. The communication interface 2002 can be configured with one or more standalone receivers and/or transmitters, as well as one or more transceivers. In the illustrated example, the communication interface 2002 includes a transmitter 2014 and a receiver 2016.

The memory device 2008 may represent one or more memory devices. As indicated, the memory device 2008 may maintain network-related information 2018 along with other information used by the apparatus 2000. In some implementations, the memory device 2008 and the storage medium 2004 are implemented as a common memory component. The memory device 2008 may also be used for storing data that is manipulated by the processing circuit 2010 or some other component of the apparatus 2000.

The storage medium 2004 may represent one or more computer-readable, machine-readable, and/or processor-readable devices for storing code, such as processor executable code or instructions (e.g., software, firmware), electronic data, databases, or other digital information. The storage medium 2004 may also be used for storing data that is manipulated by the processing circuit 2010 when executing code. The storage medium 2004 may be any available media that can be accessed by a general purpose or special purpose processor, including portable or fixed storage devices, optical storage devices, and various other mediums capable of storing, containing or carrying code.

By way of example and not limitation, the storage medium 2004 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 2004 may be embodied in an article of manufacture (e.g., a computer program product). By way of example, a computer program product may include a computer-readable medium in packaging materials. In view of the above, in some implementations, the storage medium 2004 may be a non-transitory (e.g., tangible) storage medium.

The storage medium 2004 may be coupled to the processing circuit 2010 such that the processing circuit 2010 can read information from, and write information to, the storage medium 2004. That is, the storage medium 2004 can be coupled to the processing circuit 2010 so that the storage medium 2004 is at least accessible by the processing circuit 2010, including examples where at least one storage medium is integral to the processing circuit 2010 and/or examples where at least one storage medium is separate from the processing circuit 2010 (e.g., resident in the apparatus 2000, external to the apparatus 2000, distributed across multiple entities, etc.).

Code stored by the storage medium 2004, when executed by the processing circuit 2010, causes the processing circuit 2010 to perform one or more of the various functions and/or process operations described herein. For example, the storage medium 2004 may include operations configured for regulating operations at one or more hardware blocks of the processing circuit 2010, as well as to utilize the communication interface 2002 for wireless communication utilizing their respective communication protocols.

The processing circuit 2010 is generally adapted for processing, including the execution of such code stored on the storage medium 2004. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2010 is arranged to obtain, process and/or send data, control data access and storage, issue commands, and control other desired operations. The processing circuit 2010 may include circuitry configured to implement desired code provided by appropriate media in at least one example. For example, the processing circuit 2010 may be implemented as one or more processors, one or more controllers, and/or other structure configured to execute executable code. Examples of the processing circuit 2010 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2010 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2010 are for illustration and other suitable configurations within the scope of the disclosure are also contemplated.

According to one or more aspects of the disclosure, the processing circuit 2010 may be adapted to perform any or all of the features, processes, functions, operations and/or routines for any or all of the apparatuses described herein. As used herein, the term "adapted" in relation to the processing circuit 2010 may refer to the processing circuit 2010 being one or more of configured, employed, implemented, and/or programmed to perform a particular process, function, operation and/or routine according to various features described herein.

According to at least one example of the apparatus 2000, the processing circuit 2010 may include one or more of a circuit/module for receiving at least one parameter 2020, a circuit/module for establishing a network 2022, a circuit/module for communicating 2024, a circuit/module for receiving a query 2026, and a circuit/module for advertising availability 2028.

The circuit/module for receiving at least one parameter 2020 may include circuitry and/or code (e.g., code for receiving at least one parameter 2030 stored on the storage medium 2004) adapted to perform several functions relating to, for example, receiving at least one parameter for establishment of a multiple access virtual wireless communication network, wherein the at least one parameter includes traffic management information for the multiple access virtual wireless communication network. Initially, the circuit/module for receiving at least one parameter 2020 obtains received information. For example, the circuit/module for receiving at least one parameter 2020 may obtain this information directly from a component of the apparatus (e.g., the receiver 2016, the memory device 2008, or some other component) or from a device (e.g., an access terminal) that transmitted the parameter(s). In some implementations, the circuit/module for receiving at least one parameter 2020 identifies a memory location of a value in the memory device 2008 and invokes a read of that location. In some implementations, the circuit/module for receiving at least one parameter 2020 processes the received information. The circuit/module for receiving at least one parameter 2020 then outputs the received information (e.g., stores the parameter(s) in the memory device 2008 or sends the parameter(s) to another component of the apparatus 2000).

The circuit/module for establishing a network 2022 may include circuitry and/or code (e.g., code for establishing a network 2032 stored on the storage medium 2004) adapted to perform several functions relating to, for example, establishing the multiple access virtual wireless communication network according to the at least one parameter received by the circuit/module for receiving at least one parameter 2020. Initially, this involves obtaining the parameter. Upon obtaining the parameter, the circuit/module for establishing a network 2022 determines how to configure the network based on the parameter, and then configures (e.g., by sending messages) components of a first wireless network (e.g., RAN nodes) to support multiple access virtual wireless communication network connectivity.

The circuit/module for communicating 2024 may include circuitry and/or code (e.g., code for communicating 2034 stored on the storage medium 2004) adapted to perform several functions relating to, for example, communicating at least one of credential information, operational information, information that indicates that a first wireless communication network supports the establishment of the multiple access virtual wireless communication network, or a response to a query. In some implementations, this involves obtaining the information from a component of the apparatus 2000 (e.g., from the receiver 2016 or the memory device 2008). Upon obtaining the information, the circuit/module for communicating 2024 then sends the information directly (e.g., if the circuit/module for communicating 2024 includes a transmitter) or sends the information to another component (e.g., the transmitter 2014) for transmission to a device (e.g., an access terminal).

The circuit/module for receiving a query 2026 may include circuitry and/or code (e.g., code for receiving a query 2036 stored on the storage medium 2004) adapted to perform several functions relating to, for example, receiving a query regarding whether a first wireless communication network supports the establishment of the multiple access virtual wireless communication network. Initially, the circuit/module for receiving a query 2026 obtains a received query. For example, the circuit/module for receiving a query 2036 may obtain the query from a component of the apparatus (e.g., the receiver 2016, the memory device 2008, or some other component) or directly from a device (e.g., an access terminal) that transmitted the query. In some implementations, the circuit/module for receiving a query 2036 identifies a memory location in the memory device 2008 that stores the query and invokes a read of that location. In some implementations, the circuit/module for receiving a query 2036 processes the received query to determine an action to be taken. The circuit/module for receiving a query 2036 then outputs an indication of the result of the processing (e.g., stores the information in the memory device 2008 or sends the information to another component of the apparatus 2000).

The circuit/module for advertising availability 2028 may include circuitry and/or code (e.g., code for advertising availability 2038 stored on the storage medium 2004) adapted to perform several functions relating to, for example, advertising availability of multiple access virtual wireless communication network connectivity. Initially, the circuit/module for advertising availability 2028 determines whether the connectivity is available. For example, the circuit/module for advertising availability 2028 may obtain an indication of this from a component of the apparatus 2000 (e.g., the memory device 2008, or some other component). The circuit/module for advertising availability 2028 then directly advertises an indication of availability (e.g., if the circuit/module for advertising availability 2028 includes a transmitter) or sends such an indication to another component (e.g., the transmitter 2014) for transmission to another device (e.g., an access terminal). As discussed herein, the advertising may involve broadcasting, a response to a query, or some other type of signaling.

As mentioned above, code stored by the storage medium 2004, when executed by the processing circuit 2010, causes the processing circuit 2010 to perform one or more of the various functions and/or process operations described herein. For example, the storage medium 2004 may include one or more of the code for receiving at least one parameter 2030, the code for establishing a network 2032, the code for communicating 2034, the code for receiving a query 2036, or the code for advertising availability 2038.

Example Process

Figure 21:
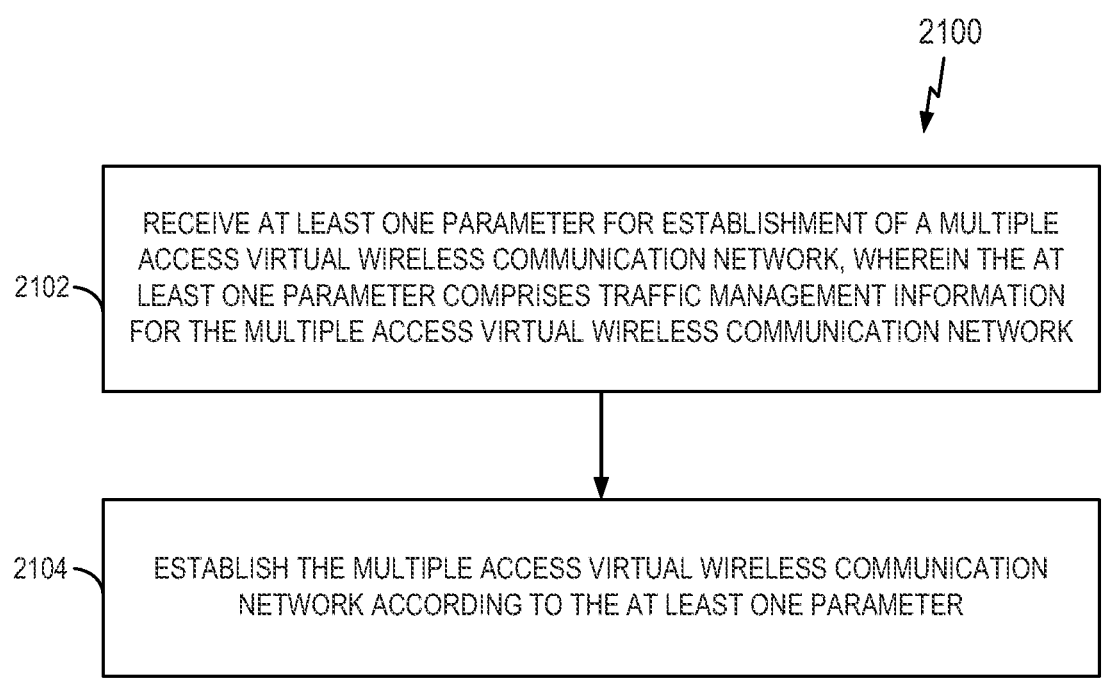
FIG. 21 illustrates an example of a process for establishing a multiple access virtual wireless communication network in accordance with some aspects of the disclosure.

FIG. 21 illustrates a process 2100 for establishing a virtual wireless communication network in accordance with some aspects of the disclosure. The process 2100 may take place within a processing circuit (e.g., the processing circuit 2010 of FIG. 20), which may be located in a network node, or some other suitable apparatus. Of course, in various aspects within the scope of the disclosure, the process 2100 may be implemented by any suitable apparatus capable of supporting virtual wireless communication network-related operations.

At block 2102, at least one parameter for establishment of a multiple access virtual wireless communication network is received. For example, a network entity (e.g., a DMVNO server or an authentication entity) may receive from a UE a request to establish a virtual wireless communication network. In some aspects, the multiple access virtual wireless communication network is a dynamic mobile virtual network operator (DMVNO).

In some aspects, information that indicates that a first wireless communication network supports the establishment of the multiple access virtual wireless communication network is also communicated. In accordance with additional aspects of the disclosure, the information is communicated via at least one of: a broadcast signal, a layer 2 signal, a connection establishment communication, or a protocol configuration option (PCO) information element (IE). In this case, the at least one parameter may be received at block 2102 as a result of the communication of this information.

In some aspects, a query regarding whether a first wireless communication network supports the establishment of the multiple access virtual wireless communication network may be received; and a response to the query is communicated, wherein the response indicates that the first wireless communication network supports the establishment of the multiple access virtual wireless communication network. In this case, the at least one parameter may be received at block 2102 as a result of the communication of this response.

In some aspects, the at least one parameter includes at least one of: a list of devices authorized to access the multiple access virtual wireless communication network, a location restriction for the multiple access virtual wireless communication network, a geographical coverage area for the multiple access virtual wireless communication network, an access restriction for the multiple access virtual wireless communication network, a subscription type for the multiple access virtual wireless communication network, a name for the multiple access virtual wireless communication network, time of operation for the multiple access virtual wireless communication network, services provided by the multiple access virtual wireless communication network, or a multiple access virtual wireless communication network type.

At block 2104, the multiple access virtual wireless communication network is established according to the at least one parameter. For example, a network entity (e.g., a DMVNO server or an authentication entity) may verify that the UE is authorized to establish a virtual wireless communication network and, if so, the network entity establishes the virtual wireless communication network based on one or more parameters received from the UE and, optionally, one or more parameters specified by the network.

In some aspects, credential information for the establishment of the multiple access virtual wireless communication network is also communicated; and the credential information includes at least one of: authentication information that authorizes a device to establish the multiple access virtual wireless communication network, or an identifier of the multiple access virtual wireless communication network.

In some aspects, operational information for the multiple access virtual wireless communication network is also communicated to at least one of: a radio access network node or a wireless access node. In accordance with additional aspects of the disclosure, the operational information includes at least one of: traffic handling information for the multiple access virtual wireless communication network, multiple access virtual wireless communication network information designated for nodes at a specified location, policy for managing multiple access virtual wireless communication network traffic according to user configuration, or charging policy for the multiple access virtual wireless communication network.

In some aspects, the availability of multiple access virtual wireless communication network connectivity may also be advertised. For example, once a network establishes a multiple access virtual wireless communication network, network components (e.g., access points) associated with the multiple access virtual wireless communication network may advertise (e.g., broadcast) an indication of the connectivity availability.

CONCLUSION

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein. Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A wireless access terminal, comprising:
   a memory device;
   a processing circuit coupled to the memory device and configured to:
      receive information indicating that a first wireless communication network supports establishment of a multiple access virtual wireless communication network;
      define a dynamic subscription with at least one parameter for the establishment of the multiple access virtual wireless communication network at the first wireless communication network, wherein the at least one parameter includes traffic management information, the traffic management information including at least traffic routing information for the multiple access virtual wireless communication network; and
      utilize a transceiver to transmit the dynamic subscription to the first wireless communication network to initiate establishment of the multiple access virtual wireless communication network according to the at least one parameter.

2. The wireless access terminal of claim 1, wherein the at least one parameter comprises at least one of:
   a list of devices authorized to access the multiple access virtual wireless communication network,
   a location restriction for the multiple access virtual wireless communication network,
   a geographical coverage area for the multiple access virtual wireless communication network,
   an access restriction for the multiple access virtual wireless communication network,
   a list of Access Point Names to be used for connectivity with the virtual wireless communication network,
   a subscription type for the multiple access virtual wireless communication network,
   a name for the multiple access virtual wireless communication network,
   time of operation for the multiple access virtual wireless communication network,
   services provided by the multiple access virtual wireless communication network, or
   a multiple access virtual wireless communication network type.

3. The wireless access terminal of claim 1, wherein:
   the dynamic subscription includes credential information for the establishment of the multiple access virtual wireless communication network; and
   the credential information comprises at least one of: authentication information that authorizes a device to establish the multiple access virtual wireless communication network, or an identifier of the multiple access virtual wireless communication network.

4. The wireless access terminal of claim 3, wherein the credential information is received from a third party that sponsors the multiple access virtual wireless communication network.

5. The wireless access terminal of claim 3, wherein the processing circuit is further configured to:
   receive a charge including costs for one or more other wireless access terminals accessing the multiple access virtual wireless communication network.

6. The wireless access terminal of claim 1, wherein the information that indicates that the first wireless communication network supports the establishment of the multiple access virtual wireless communication network is received via at least one of:
- a broadcast signal,
- a layer 2 signal,
- a connection establishment communication, or
- a protocol configuration option (PCO) information element (IE).

7. The wireless access terminal of claim 1, wherein the information that indicates that the first wireless communication network supports the establishment of the multiple access virtual wireless communication network includes at least one of:
- a list of Access Point Names to be used for the establishment of the multiple access virtual wireless communication network, or
- a list of addresses of the servers to be used for the establishment of the multiple access virtual wireless communication network.

8. The wireless access terminal of claim 1, wherein the processing circuit is further configured to:
- send a query regarding whether the first wireless communication network supports the establishment of the multiple access virtual wireless communication network; and
- receive a response to the query, wherein the response indicates that the first wireless communication network supports the establishment of the multiple access virtual wireless communication network.

9. The wireless access terminal of claim 1, wherein the processing circuit is further configured to:
- identify at least one device allowed to access the multiple access virtual wireless communication network; and
- communicate a credential associated with the multiple access virtual wireless communication network to the at least one device.

10. The wireless terminal of claim 1, wherein the traffic routing information indicates to route traffic of the multiple access virtual wireless communication network to a local breakout or a specified node.

11. A method operational at a wireless access terminal, comprising:
- receiving information indicating that a first wireless communication network supports establishment of a multiple access virtual wireless communication network; and
- defining a dynamic subscription including at least one parameter for the establishment of the multiple access virtual wireless communication network at the first wireless communication network, wherein the at least one parameter includes traffic management information, the traffic management information including at least traffic routing information for the multiple access virtual wireless communication network; and
- transmitting the dynamic subscription to the first wireless communication network to initiate establishment of the multiple access virtual wireless communication network according to the at least one parameter.

12. The method of claim 11, wherein the multiple access virtual wireless communication network includes a dynamic mobile virtual network operator (DMVNO).

13. The method of claim 11,
wherein the dynamic subscription includes credential information for establishing the multiple access virtual wireless communication network,
wherein the credential information comprises at least one of: authentication information that authorizes a device to establish the multiple access virtual wireless communication network, or an identifier of the multiple access virtual wireless communication network.

14. The method of claim 11, further comprising:
- sending a query regarding whether the first wireless communication network supports the establishment of the multiple access virtual wireless communication network; and
- receiving a response to the query, wherein the response indicates that the first wireless communication network supports the establishment of the multiple access virtual wireless communication network.

15. The method of claim 11, further comprising:
- identifying at least one device allowed to access the multiple access virtual wireless communication network; and
- communicating a credential associated with the multiple access virtual wireless communication network to the at least one device.

16. A network entity, comprising:
- a memory device;
- a processing circuit coupled to the memory device and configured to:
  - utilize a transceiver to transmit information that indicates that a first wireless communication network supports establishment of a multiple access virtual wireless communication network;
  - utilize the transceiver to receive a dynamic subscription including at least one parameter defined by a wireless access terminal for establishment of the multiple access virtual wireless communication network, wherein the at least one parameter comprises traffic management information, the traffic management information including at least traffic routing information for the multiple access virtual wireless communication network; and
  - establish, as a result of receiving the dynamic subscription from the wireless access terminal, the multiple access virtual wireless communication network according to the at least one parameter.

17. The network entity of claim 16, wherein the multiple access virtual wireless communication network includes a dynamic mobile virtual network operator (DMVNO).

18. The network entity of claim 16, wherein the at least one parameter comprises at least one of:
- a list of devices authorized to access the multiple access virtual wireless communication network,
- a location restriction for the multiple access virtual wireless communication network,
- a geographical coverage area for the multiple access virtual wireless communication network,
- an access restriction for the multiple access virtual wireless communication network,
- a list of Access Point Names to be used for connectivity with the virtual wireless communication network,
- a subscription type for the multiple access virtual wireless communication network,
- a name for the multiple access virtual wireless communication network,
- time of operation for the multiple access virtual wireless communication network,
- services provided by the multiple access virtual wireless communication network, or
- a multiple access virtual wireless communication network type.

19. The network entity of claim 16, wherein:
the processing circuit is further configured to communicate credential information for the establishment of the multiple access virtual wireless communication network; and
the credential information comprises at least one of: authentication information that authorizes a device to establish the multiple access virtual wireless communication network, or an identifier of the multiple access virtual wireless communication network.

20. The network entity of claim 16, wherein the processing circuit is further configured to:
communicate operational information for the multiple access virtual wireless communication network to at least one of: a radio access network node or a wireless access node.

21. The network entity of claim 20, wherein the operational information comprises at least one of:
traffic handling information for the multiple access virtual wireless communication network,
multiple access virtual wireless communication network information designated for nodes at a specified location,
a policy for managing multiple access virtual wireless communication network traffic according to user configuration, or
a charging policy for the multiple access virtual wireless communication network.

22. The network entity of claim 16, wherein the information that indicates that a first wireless communication network supports the establishment of the multiple access virtual wireless communication network is sent via at least one of:
a broadcast signal,
a layer 2 signal,
a connection establishment communication, or
a protocol configuration option (PCO) information element (IE).

23. The network entity of claim 16, wherein the processing circuit is further configured to:
receive a query regarding whether a first wireless communication network supports the establishment of the multiple access virtual wireless communication network; and
send the information in response to the query.

24. The network entity of claim 16, wherein the processing circuit is further configured to:
advertise connectivity availability for an established multiple access virtual wireless communication network.

25. A method operational at a network entity, comprising:
transmitting information that indicates that a first wireless communication network supports establishment of a multiple access virtual wireless communication network;
receiving, from a wireless access terminal, a dynamic subscription including at least one parameter defined by the wireless access terminal for establishing the multiple access virtual wireless communication network, wherein the at least one parameter comprises traffic management information, the traffic management information including at least traffic routing information for the multiple access virtual wireless communication network; and
establishing, as a result of receiving the dynamic subscription from the wireless access terminal, the multiple access virtual wireless communication network according to the at least one parameter.

26. The method of claim 25, wherein the multiple access virtual wireless communication network includes a dynamic mobile virtual network operator (DMVNO).

27. The method of claim 25, further comprising:
communicating credential information for establishing the multiple access virtual wireless communication network,
wherein the credential information comprises at least one of: authentication information that authorizes a device to establish the multiple access virtual wireless communication network, or an identifier of the multiple access virtual wireless communication network.

28. The method of claim 25, further comprising:
communicating operational information for the multiple access virtual wireless communication network to at least one of: a radio access network node or a wireless access node,
wherein the operational information comprises at least one of: traffic handling information for the multiple access virtual wireless communication network, multiple access virtual wireless communication network information designated for nodes at a specified location, a policy for managing multiple access virtual wireless communication network traffic according to user configuration, or a charging policy for the multiple access virtual wireless communication network.

29. The method of claim 25,
wherein the information that indicates that a first wireless communication network supports the establishment of the multiple access virtual wireless communication network is sent via at least one of:
a broadcast signal,
a layer 2 signal, a connection establishment communication, or
a protocol configuration option (PCO) information element (IE).

* * * * *